United States Patent
Fisher

(10) Patent No.: US 12,040,601 B2
(45) Date of Patent: Jul. 16, 2024

(54) ELECTRICAL JUNCTION BOX COVER AND RELATED ASSEMBLIES AND METHODS FOR COMPLETING ELECTRICAL INSTALLATIONS

(71) Applicant: Chad Fisher, Urbandale, IA (US)

(72) Inventor: Chad Fisher, Urbandale, IA (US)

( * ) Notice: Subject to any disclaimer, the term of this patent is extended or adjusted under 35 U.S.C. 154(b) by 0 days.

(21) Appl. No.: 17/691,019

(22) Filed: Mar. 9, 2022

(65) Prior Publication Data

US 2022/0302688 A1 Sep. 22, 2022

Related U.S. Application Data

(63) Continuation of application No. 17/105,157, filed on Nov. 25, 2020, now Pat. No. 11,303,104, which is a continuation of application No. 15/255,112, filed on Sep. 1, 2016, now Pat. No. 10,862,285.

(60) Provisional application No. 62/212,963, filed on Sep. 1, 2015.

(51) Int. Cl.
*H02G 3/00* (2006.01)
*H02G 3/08* (2006.01)
*H02G 3/12* (2006.01)

(52) U.S. Cl.
CPC ............. *H02G 3/081* (2013.01); *H02G 3/121* (2013.01)

(58) Field of Classification Search
CPC ... H02G 3/08; H05K 5/00; H05K 5/02; B60R 16/0239
See application file for complete search history.

(56) References Cited

U.S. PATENT DOCUMENTS

| | | | |
|---|---|---|---|
| 6,418,036 B1 * | 7/2002 | Rodrigues | H02G 3/12 361/818 |
| D462,664 S | 9/2002 | Roesch et al. | |
| D519,930 S | 5/2006 | Hull et al. | |
| 7,145,075 B2 | 12/2006 | Hull et al. | |
| 7,179,994 B2 | 2/2007 | Elberson | |
| D538,751 S | 3/2007 | Kiely | |
| D563,896 S | 3/2008 | Greenslate | |
| 7,390,965 B2 * | 6/2008 | Hartwig | H02G 3/14 174/67 |
| 7,549,549 B1 | 6/2009 | Kiely | |
| D601,096 S | 9/2009 | Vigorito et al. | |
| D626,509 S | 11/2010 | Severing | |
| D630,598 S | 1/2011 | Bleau et al. | |
| D640,982 S | 7/2011 | Dixon et al. | |
| 8,013,243 B2 | 9/2011 | Korcz et al. | |
| D676,814 S | 2/2013 | Paul | |
| D698,737 S | 2/2014 | Hagarty | |
| D707,635 S | 6/2014 | Hagarty | |
| D709,835 S | 7/2014 | Jones | |

(Continued)

*Primary Examiner* — Pete T Lee
(74) *Attorney, Agent, or Firm* — McKee, Voorhees & Sease, PLC

(57) ABSTRACT

This invention relates to electrical junction box covers for temporary use during application of drywall and other finish work. Electrical junction boxes include any type of electrical outlet or switch box, including communication boxes for cable, Ethernet, phone, or any other related system. The covers of the invention prevent debris from entering the electrical junction boxes during the application of drywall and finish work. The covers protect electrical and data cabling and provide substantial efficiencies in construction of residential and commercial structures.

43 Claims, 25 Drawing Sheets

(56) References Cited

U.S. PATENT DOCUMENTS

| | | |
|---|---|---|
| D711,834 S | 8/2014 | Jones |
| D719,528 S | 12/2014 | Hagarty |
| 8,933,331 B1 * | 1/2015 | Gretz ..................... E04B 2/00 |
| | | 174/53 |
| D722,296 S | 2/2015 | Taylor |
| D722,978 S | 2/2015 | Hagarty |
| D752,520 S | 3/2016 | Hagarty |
| D754,605 S | 4/2016 | McMillan |
| D766,185 S | 9/2016 | Hagarty |
| D766,186 S | 9/2016 | Hagarty |
| D778,241 S | 2/2017 | Holbrook et al. |
| D810,696 S | 2/2018 | Hagarty |
| D868,702 S | 12/2019 | Hagarty |
| D868,706 S | 12/2019 | Hagarty |
| 2008/0236859 A1 * | 10/2008 | de la Borbolla ......... H02G 3/14 |
| | | 174/66 |

* cited by examiner

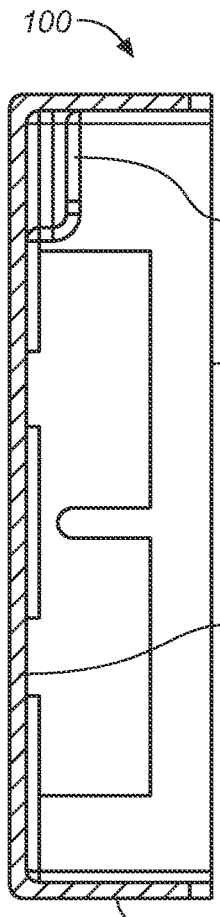 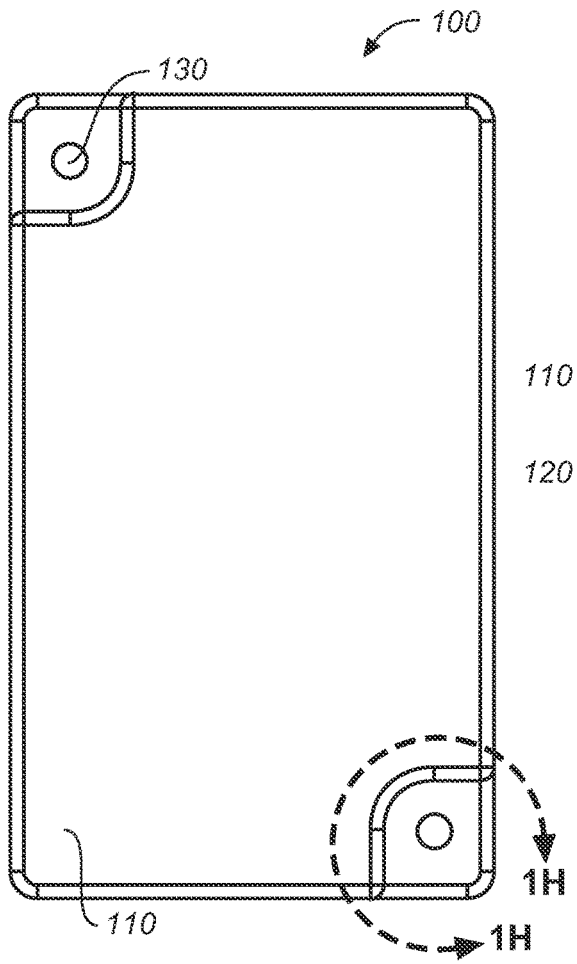 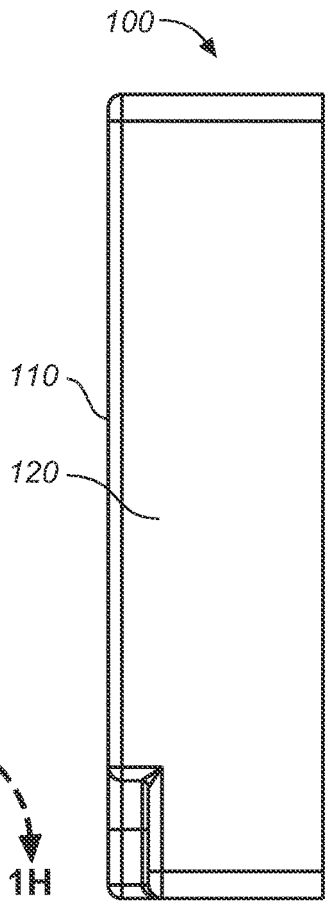
FIG. 1E  FIG. 1F  FIG. 1G
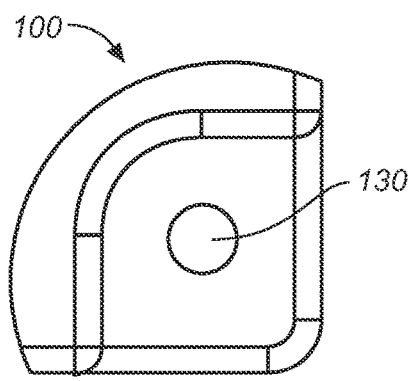
FIG. 1H

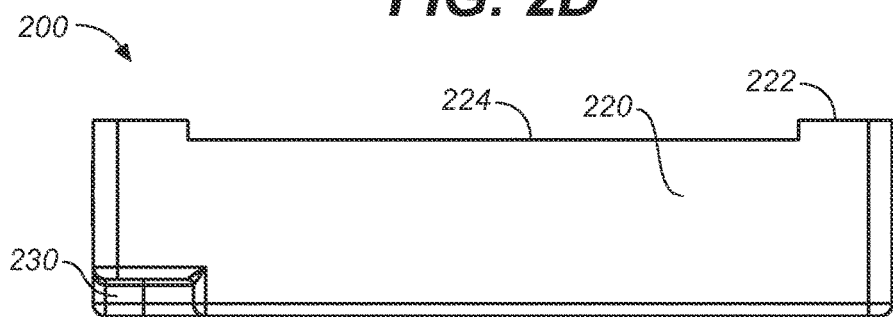
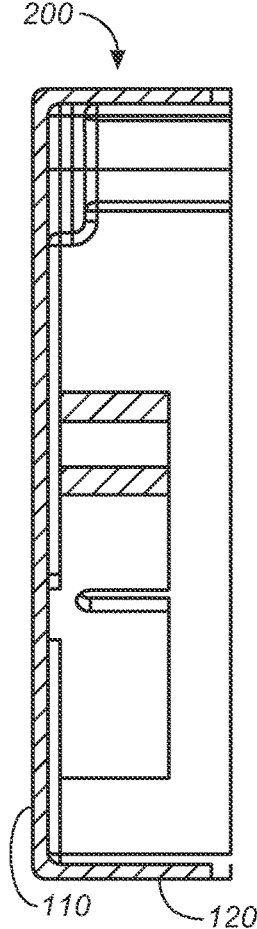
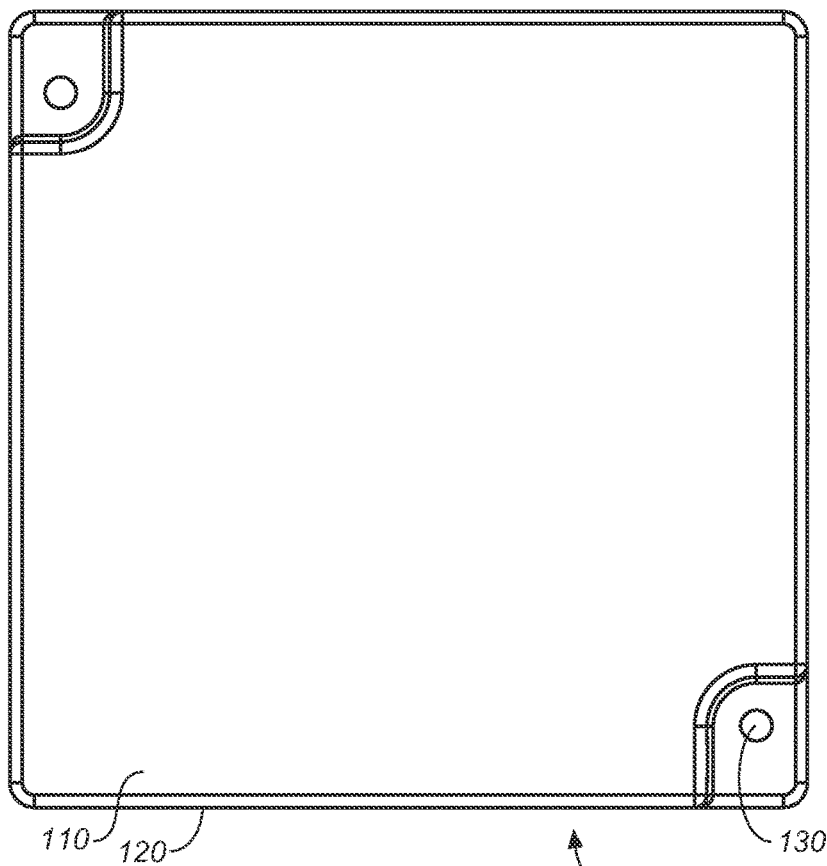

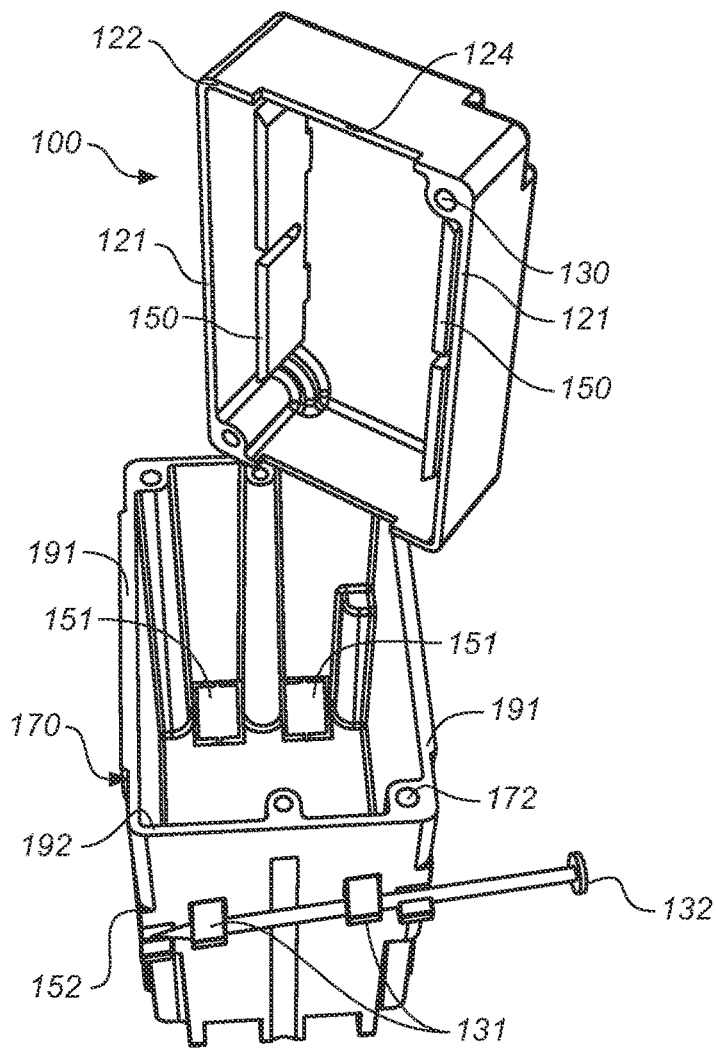
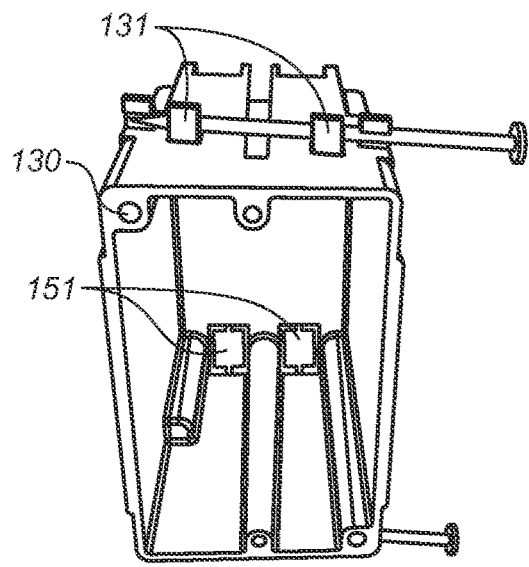
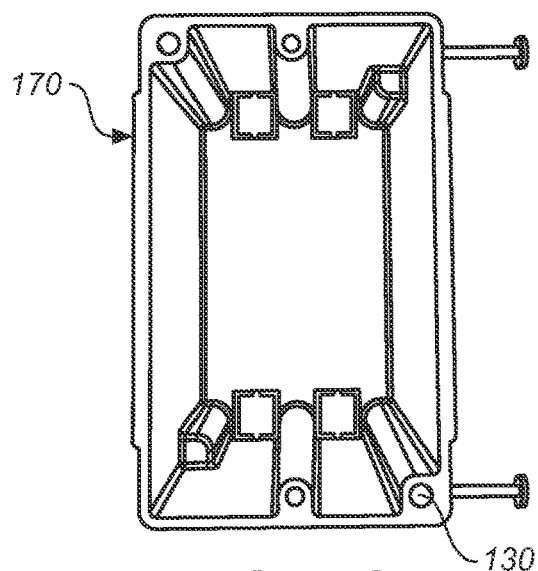
FIG. 4A
FIG. 4B
FIG. 4C though many tradespeople and steps are required, this invention makes the work more efficient, simplifies the process of wiring electrical installations, and protects the electrical wiring and junction box during construction.

ELECTRICAL JUNCTION BOX COVER AND RELATED ASSEMBLIES AND METHODS FOR COMPLETING ELECTRICAL INSTALLATIONS

This application claims priority to U.S. Provisional Patent Application Ser. No. 62/212,963 filed Sep. 1, 2016. The above referenced provisional patent application is incorporated herein by reference as if restated in full. All references cited herein, including, but not limited to patents and patent applications, are incorporated by reference in their entirety.

BACKGROUND

Construction of residential and commercial structures involves multiple phases and tradespeople. The steps are generally completed in a specific order, and each step may depend on completion of the preceding step. Also, because the construction of such structures inherently involves tradespeople with different expertise, it is common for separate construction steps to depend on completion of an earlier step and to be performed by completely different personnel.

The current construction process generally includes:

1) Framers erect the walls, floors and ceilings of the structure. The walls may be constructed of wood or metal studs, and the floor and ceiling joists of wood or metal beams;
2) After rough framing of walls is complete and before erecting the wall panels, a tradesperson such as an electrician installs dedicated electrical junction boxes for electrical and data communication wiring by attaching the boxes to the wall studs or ceiling joists;
3) The electrician routes wiring from a main panel to each box, depending on the function intended for the box and the access that will be provided to the occupant. The installation is a rough process where the wiring and junctions are not active (e.g., hot). In current practices, wires and cabling with bare terminal ends are capped off, rolled up and pushed back into the box. Thus, terminal end of the cables are typically not connected to their intended fixture, such as a light switch, electrical outlet or data port until completion of a later finishing step as described below;
4) Drywall installers install drywall over the walls and ceilings by attach the wall panels to the studs and joists. To allow access to the electrical junction boxes, the drywall installers rough cut a hole to accommodate the electrical junction box and remove the resulting cut-out panels from the drywall using a router or other rough cut tool. The shape of the cut out opening is meant to roughly match the shape of the electrical junction box, so that the resulting drywall surface will closely surround the junction boxes that are already in place. During drywall installation, it is common that cutting out holes for one or more of the junction boxes is inadvertently missed and the box becomes permanently covered. This typically occurs if the box did not protrude enough from the stud when the box was attached to the stud. Also, some cut outs in the drywall may not be properly shaped and will require repairs to the drywall surrounding the protruding junction box. Such repairs are-typically performed with dry wall tape and joint compound, which is a spreadable sealant commonly referred to as "mud," to clean up the final appearance-of the drywall surrounding the junction box. Also, because the drywall installers do not have ultimate responsibility for completing the electrical and data connections, it is common for drywall installers to cut or damage wires and cabling during installation of the drywall panels;
5) Once drywall is hung and boxes have been cut out, drywall installers finish seams beneath the drywall sheets using tape and sealant and typically finish the border around the electrical junction boxes with joint compound to create a sealed border around the periphery of the junction boxes. The drywall installers may also texture the drywall and repair any imperfections in the final wall panels. During this process, extra joint compound and debris is commonly pushed into the previously installed electrical junction boxes and this debris can cover the terminal ends of the wiring and cabling and can damage the wires/cables thereby making future connection of sockets, switches, or data ports more difficult;
6) Once the drywall process is completed the electrician returns to the job to complete the installation of the outlet, switch or communication fixture intended for the junction box. At this point, the electrician must clean and repair each junction box by hand to remove excess joint compound and debris prior to installing the hot outlets, switches, and communication wiring.

Another challenge confronting the electrician is the need to pull the electrical junction box away from the point of attachment of the electrical junction box to the wall beams to align the outer edge of the junction box with the planar surface of the drywall. Typically this is done by manually grabbing the metal outlet tabs that are provided on outlets and plugs. However, these structures are not designed for this purpose and are often flimsy due to damage to the drywall at the point of attachment-resulting in an unstable connection. Accordingly, these steps require additional manipulations of the junction box that can damage the surrounding drywall or the electrical junction box or the final fixtures.

Still further during the process of final electrical installation, electrician may accidentally damage the finished drywall around the box, particularly when manually removing debris and excess joint compound from a large number of junction boxes, resulting in the requirement of additional touch up work to the drywall surface that has to be done either by the electrician or by a subsequent drywall finishing operation.

Therefore, the process of completing dry wall and electrical finishing involves a series of steps by different tradespeople with different expertise and that can add expenses and delay to a building project.

SUMMARY OF THE INVENTION

The present invention is an electrical junction box cover and an assembly comprised of the electrical junction box together with the temporary cover-to protect the box and the electrical fixtures and cables contained within the electrical during drywall finish work. The invention includes the electrical junction box, the temporary cover, attachment mechanisms for joining the cover to the junction box, electrical and data-outlets contained within the junction box, together with cabling having a terminal end attached to the outlets and an intermediate end preferably contained within the junction box. The assembly includes the completely wired and connected electrical junction box, with the temporary protective cover having been removed, such that the internal fixtures, outlets and structures, such as plugs, switches, and data ports, are substantially free of debris and other contaminants such as extra joint compound.

The invention includes an assembly which comprises the electrical junction box and the temporary cover, together with the operative electrical and data components contained therein in any state of completion. In some instances, the temporary cover may be placed over the junction box with only bare wires, having a terminal end, contained therein. In other instances, the wiring for electrical structures, or data cabling can already be complete with the temporary cover in place to protect these components, and an intermediate end of the wiring or cabling terminates on a plug/receptacle for attachment to buildings wiring or cabling. The assembly can include a drywall border surrounding the electrical junction box wherein the temporary cover protects the internal structures during a drywall finishing process.

The methods of the invention include the steps of removably installing the junction box cover prior to installing drywall around the box, completing drywall finish work around the box with the removable cover in place, and removing the cover to permit access to the junction box. The methods of the invention include the steps of removing the junction box cover from its attachment to the junction box and attaching it to the junction box prior to drywall installation and after the electrician has wired the plug and or switch to the junction box. The outlets, switches, ports, and other functional components designed to be placed within the junction box can be installed by the electrician either-before or after the drywall installation step. In either case, the internal structure of the electrical junction box remains free of debris and excess joint compound.

In one embodiment of the invention, the electrical junction box is fitted with switches, outlets, data ports, or other functional apparatus prior to being attached to the wall during electrical "rough in" during the construction. In this embodiment, large-scale production of an electrical junction box is enabled wherein the electrical junction box is preassembled with functional components already hard wired in place. This reduces the installation at the residential or commercial structure to essentially a single step whereby the entire assembly is simply attached to the wall beam and the-intermediate end of the wiring is simply connected to the existing buildings wiring or cabling that is already in place. In such an embodiment, the terminal end of the wiring is attached to the functional components, and typically terminates outside the electrical junction box at a free end separate from the terminal end. In either case the entire electrical junction box and electrical switch/outlet/port component assembly are connected to the building electrical/data connection by attaching the wires at the free intermediate end of the assembly to the existing wiring in the building.

DESCRIPTION OF THE FIGURES

FIGS. 1a-1h are an electrical junction box and a temporary protective cover showing the structure and design of the cover and electrical box, together with means for temporarily attaching the cover to the box.

FIGS. 2a-2f depict a second embodiment of a double electrical junction box and a temporary protective cover similar to the embodiment of FIGS. 1a-1h.

FIGS. 4a-4c illustrate prototypes of the invention that are applicable, but not limited to, residential applications.

DETAILED DESCRIPTION OF THE INVENTION

Figure 1A:
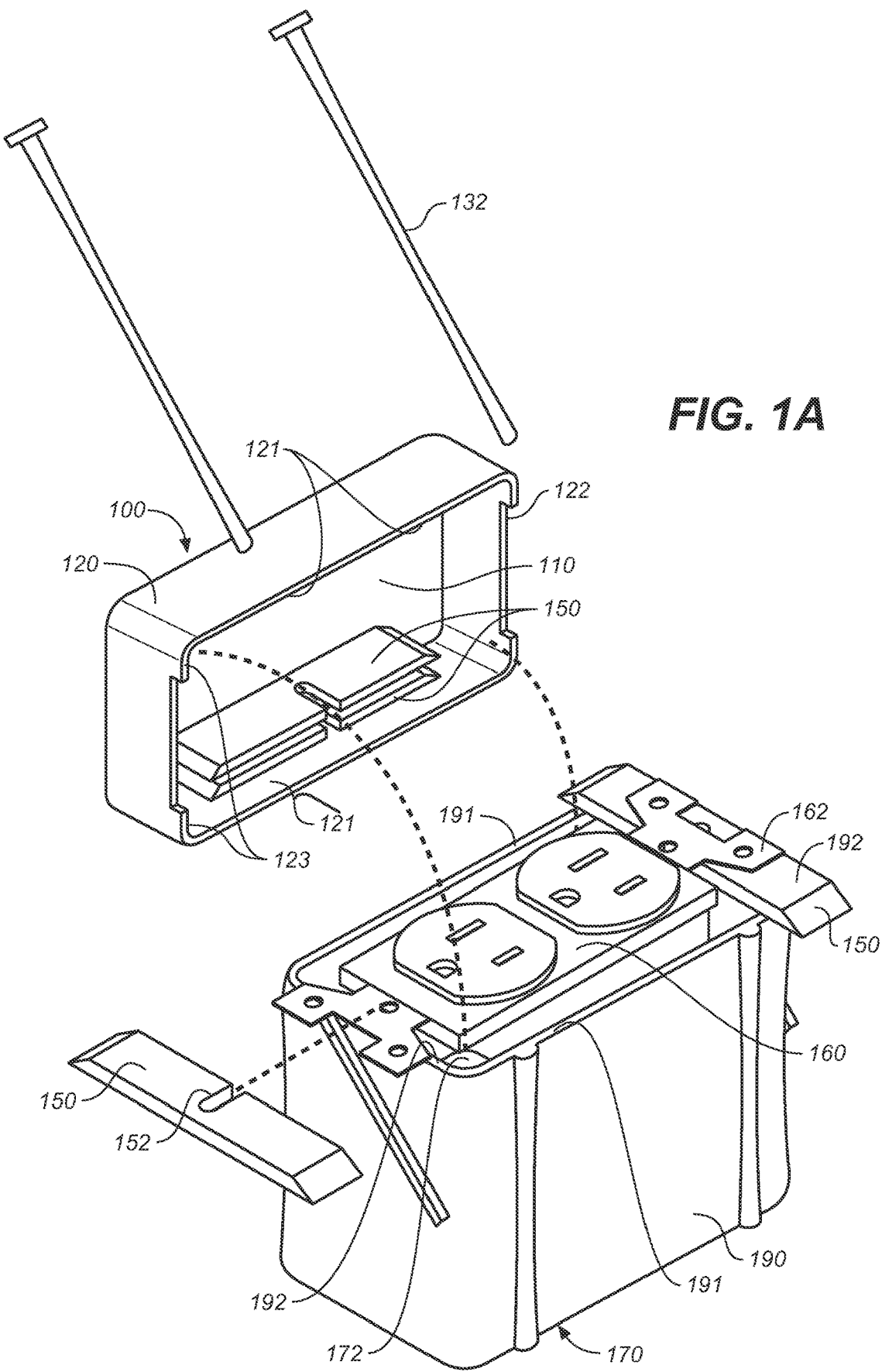
Figure 1B:
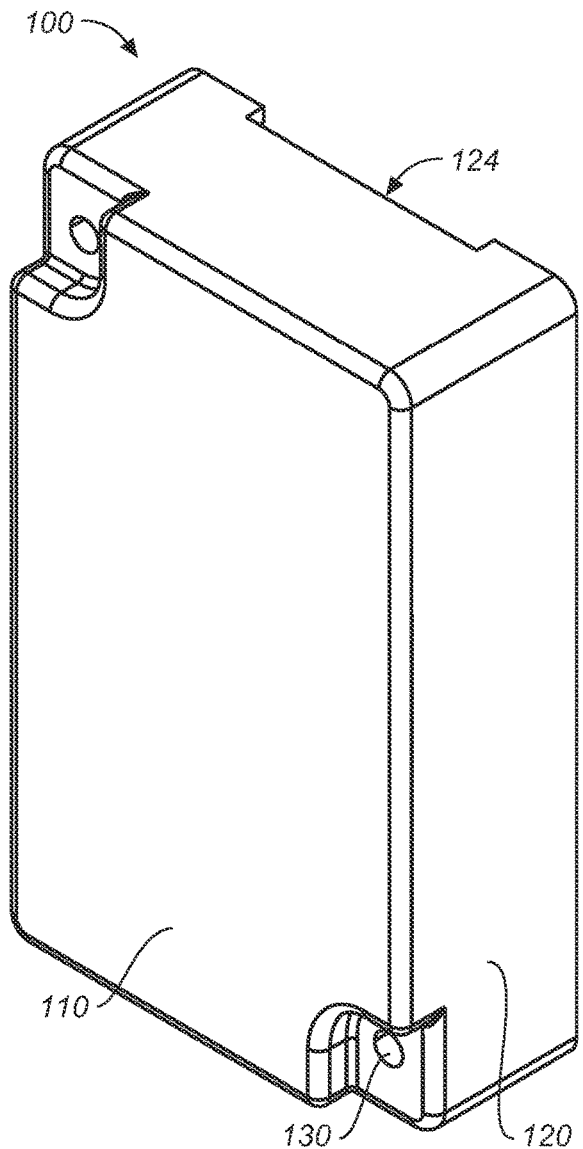
Figure 1C:
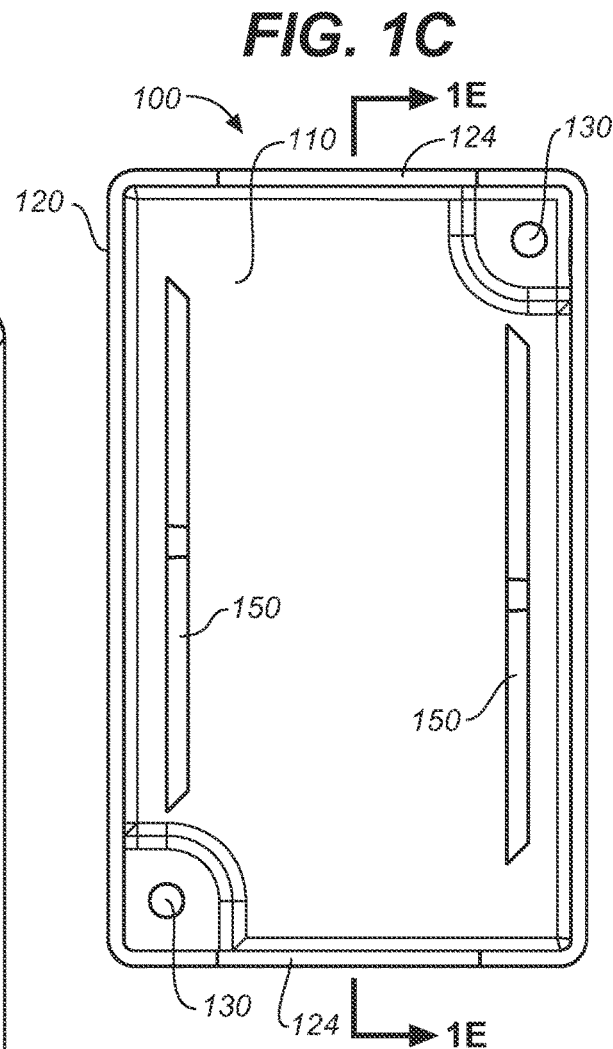
Figure 1D:
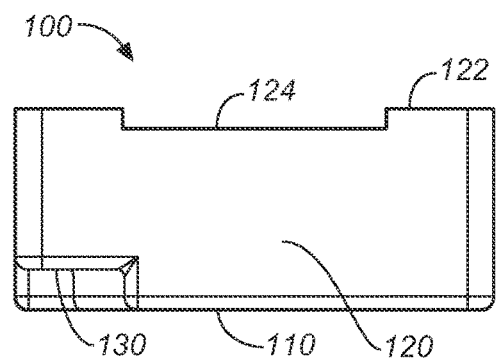

This invention is electrical junction box covers and assemblies comprised of a removable cover for temporarily covering an electrical junction box during finish work. The electrical junction box cover temporarily protects the electrical junction box, particularly during drywall finishing steps. Most importantly, the cooperative relationship between the design of the temporary cover and industry-standard electrical junction boxes prevents debris from entering the junction box during construction, particularly where debris would impede the ability of an electrician to complete necessary wiring and electrical connections. The protective cover may be releasably attached to the electrical junction box then removed as desired, at any point during the construction process where the protection of the interior of the junction box is desired, and then removed as desired.

The temporary protective cover may be releasably affixed to an electrical junction box that is substantially completely wired, including a fully wired "hot" outlet, switch, or communication fixture (e.g., a cable, phone or Ethernet connection point). For the ease of reference the functional related fixtures (together with electrical, data ports, lighting, optical, digital and connectors for the outlets/fixtures contents of the electrical junction box, including items such as communication fixtures will be referred to collectively, but not exclusively, as an "outlet." Furthermore, while the following description relies on a temporary junction box cover that is sized and configured to engagingly mate with industry standard electrical junction boxes, the present invention includes essentially any electrical box, including junction boxes, panels, arrays of switches and indicator lights, arrays of fuses or relays, and includes larger electrical boxes such as a main electrical panel, where the interior is protectable during a portion of the construction process on surrounding structures.

Methods of installing the electrical junction box, the removable electrical junction box cover, and for completing drywall and finish electrical work are also included in the invention, including methods for covering the junction box and manipulating the placement, and wiring thereof, to maximize efficiency of the building process. INSERT B The invention also includes completed assemblies featuring fully connected terminal ends of electrical wires and/or data cables where in the outlet fixture is completely wired and contained within the assembly comprised of the combination of the electrical junction box and the removable cover. In this embodiment, the terminal ends of the wires or cables are completely connected to completely secured outlet within the junction box and the opposite or immediate end is disposed outside the junction box and available for connection to existing wiring at the residential or commercial installation. For delivery and installation the entire wiring/cabling, from the immediate end to the terminal end attached to the outlets may be contained within the interior housing of the junction box. In this embodiment, the only connection that need be made is between the wires or cables existing at the structure and the intermediate end of the wiring or cables located outside the junction box, and may be joined.

In the following description of the embodiments illustrated in the figures features generally relating to a single outlet configuration are designated with reference numbers in the 100s, while features generally relating to a double outlet configuration are designated with reference numbers in the 200s, although one of ordinary skill in the art will appreciate that many of these structures are similar or identical in configuration and design and differ simply in dimensions between single, double, triplet and quad outlet configurations.

Referring to FIGS. 1a-1h, the invention is comprised of an electrical junction box cover 100 that is releasably attached to the electrical junction box 170, the cover 100 includes a cover surface 110 and four perimeter walls 120 each extending away from the cover surface 110, and terminating in an edge. Two of the peripheral walls 120 terminate in a pair of first edges 121, while the other two terminate in a pair of second edges 122. As described below, the first and second edge pairs 121, 122 sealingly engage corresponding structures on the box 170 about the outer periphery of each of the cover 100 and the electrical junction box 170. Accordingly, the overall dimensions of the cover 100, specifically the length of the peripheral wall 20, and hence the length of the first edges 121 and the second edges 122 are matched to the dimensions of the junction box 170. Accordingly, these dimensions for the cover 100 match the industry standard dimensions for a box 170, but may readily be altered according to the design of the junction box 170.

In a corresponding manner to the cover 100, the junction box 170 is comprised of four box peripheral walls 191 that terminate at four upper edges. Two of the box peripheral walls 190, terminate at a pair of third edges 191, while the other two box peripheral walls 190 terminate at a pair of fourth edges 192. A conforming engagement between the cover 100 and the box 170 is created by providing a cover with dimensions such that the length of the first pair of edges 121 matches the length of the third pair of edges 191 and the length of the second pair of edges 122 matches the length of the fourth pair of edges 192.

The height of the peripheral wall 120 is greater than the height of the highest point along a vertical distance of the outlet 160 extending away from the plane formed by the outer periphery of the box 170, and preferably less than one inch. This is simply to provide clearance when the first and second edge pairs 121, 122 are brought into engagement with the third and fourth pairs of edges 191, 192 along substantially the outer periphery of the box 100 when the cover 100 is securely, but releasably attached to the junction box 170 by virtue of the means for attachment 130. The perimeter of the cover 100, and preferably the second edge pair 122 may include one or more recesses 124 within the outer edge to provide a more effective seal between the outer peripheral wall of the junction box 170 and the edges 121, 122 of the perimeter wall 120 of the cover 100. The recesses 124 may be sized to provide clearance space to structures such as outlet tabs 162 of an outlet 160 when the cover 100 is installed over an outlet 160. The one or more recesses 124 may be sized to accommodate support structures for the outlet 160 or specifically to have a greater length than the total length of the distance between the outlet tabs 162. The outlet support structures such as may be traversed 172 to receive a fastener 132 that also traverses the removable cover to enter the complementary attachment fixture 172 to allow for removable attachment of the cover 100 to the junction box 170.

Accordingly, the cover 100 may also include one or more structures to provide the function of releasably attaching the cover 100 to the junction box 170. In the embodiment of FIG. 1a, the attachment structure is comprised of holes 130 that traverse the body of the cover 100 and have a meeting engagement with structure on the box 170 to facilitate removable attachment of the cover 100. Also as seen in FIG. 1a, simple fasteners 132 may traverse both of the cover 100 and a fixture associated with the box 170 in order to provide for releaseable attachment of the cover 100 junction box 170 shown in FIG. 1a.

Referring again to FIGS. 1a-1f, the attachment means 130 provides a connection point for releasably attaching the cover 100 to the electrical junction box 170 at any point when the electrician has finished preparing the junction box 170 and expects that additional tradespeople will be working around the box 170 such that the electrician desires to protect the contents of the box 170 from contamination with debris. The attachment means 130 may be any mechanical expedient that provides for releasable attachment of the cover 100 to the box 170. As shown in, for example, FIGS. 1a, 2a, 4a-4d, 4g, 5a-5e and 7a-b, a fastener 132 can traverse holes 130 in the cover 100 and engage complimentary attachment features 172 formed in the box 170. In the embodiment of FIG. 1a, the complimentary attachment feature 172 is simply a receiving hole into which the fastener 132 passes after traversing the body of the cover 100.

Other examples include a conventional screw, nail, pen, or tie, including zip ties or other adjustable ties that ensure close engagement between the cover 100 and the box 170.

Figure 4D:
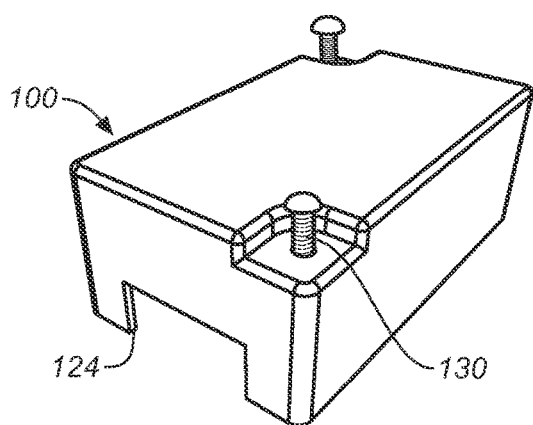
FIGS. 4d-4g illustrate prototypes of the invention that are applicable, but not limited to, commercial applications.
Figure 4E:
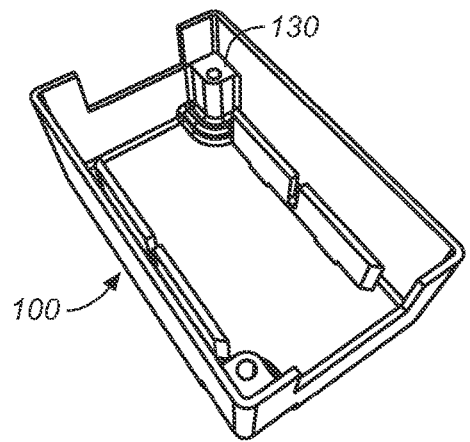

Any attachment means 130 may be located in a recessed surface, at corners of the cover, as is illustrated in, for example, FIG. 4d). The attachment structures 130 may also be recessed with respect to the opposite edge surface (inside bottom surface) of the cover 100 to accommodate various junction box plaster ring 180 geometries. The junction box plaster rings 180 are commonly referred to as "mud rings" and are secured within the junction box 170.

In an embodiment of the invention featuring a junction box plaster ring 180, the attachment means may connect the cover 100 to the plaster ring 180 rather than directly to the box 170. Because the plastic ring 180 is necessarily permanently attached to the box 170, this configuration provides equivalent releasable connection of the cover to the box 170/plaster ring 180 combination.

As described below in connection with the specific commercial junction box 170, the recessed attachment features 130 are particularly preferred in commercial applications (e.g., FIG. 4d-4g). In commercial applications, each metal junction box 170 routinely surrounds a plaster ring 180 to which sockets 160 are attached and the sockets 160 typically feature an outlet tab 162 or plurality thereof that are disposed between the sealing edges 121, 122, 191, 192 of both the cover 100 and the box 170 respectively.

In an illustrative embodiment of the box 170, the box 170 has complimentary attachment features 172 (e.g., holes or bosses) for the attachment means 130 to engage and attach to, such as via fasteners 132. The goal of the shape and design of the peripheral wall 120 of the cover 100 is to provide an effective dust and debris seal around the periphery of the engagement between the lower edge of the peripheral wall 120 and the upper edge of the wall of the box 170.

As noted above, the combination of the sealing engagement between the first and second edge pairs 121, 122 of the peripheral wall 120, the upper cover surface 110, and the sealing combination with the third and fourth edge pairs 191, 192 of the junction box 170 into the completed assembly to temporarily form a barrier between any components in the interior of the junction box 170 and any source of debris or contamination. While the contents of the junction box 170 may include a fully wired box 170, completely connected to electrical wiring and/or cables at the terminal end thereof, including a "hot" outlet 160 while the finish work such as drywall, mudding, taping and painting is completed, the cover 100 also prevents the box 170 from being completely covered during the installation of drywall. The cover 100 prevents the junction box itself, as well as any associated outlets, from being damaged during drywall installation. Accordingly, whether or not the wiring or cable connections are complete, the cover 100 prevents debris such as drywall, spackle or paint from entering the box 170. This is particularly important when the electrical junction box 170 contains fixtures such as ethernet cables, optical fibers, cable connections, and other sensitive electronic connectors that would be damaged, perhaps in ways that are not immediately apparent to the naked eye, during construction.

The cover 100 is sufficiently rigid and sized such that the dimensions of the edge of the perimeter wall 120 match the specific junction box 170 to which the cover 100 is releasably attached. As shown in FIGS. 4-10, the junction boxes 170 may be sized to accommodate a plurality of outlets 160, but in each case, the outer periphery of the cover 100 is sized to engagingly mate with the outer periphery of the top edges 121, 122, 191, 192 of the junction box 170. Because of the meeting engagement of the box 170 and the cover 100, drywall installers can easily and cleanly cut around the both the cover 100 and the box 170 when performing a drywall finishing work. Therefore, when the cover is in place, the entire junction box assembly exists as an intact unit wherein the cover 100 protects the outlets disposed within the box 170 while subsequent drywall finishing processes are performed.

In this configuration, the electrician can complete all of the hot wiring functions, understanding that a drywall finishing process is yet to be completed, with an expectation that the electrical junction box, and the functional outlets contained therein, will be protected during the drywall process. This eliminates the need for the electrician who is trimming (installing plugs and switches) during the normal trimming stage to spend any extra time trying to figure out what the "rough in" electrician did when wiring the project initially and eliminates the need for the electrician to inspect the junction box 170 after the finished drywall process. Thus, the completed assembly is minimally comprised of the cover 100, the box 170, and the attachment means 130 and functions as an intact unit to reduce the labor required for the final electrical trim process to a minimum, thereby saving time and money and improving the safety of all of the electrical and data connections formed within the junction box 170.

Referring to FIGS. 2a-2f, the electrical junction box cover 200 is releasably attached to the electrical junction box 270 generally as described above. The cover 200 includes four peripheral walls 220 extending away from the cover surface to 220 to form an enclosure. Two of the peripheral walls 220 terminate in a first edge pair 221, while the second two terminate in a second edge pair 222. The first and second pairs of edges 221, 222 sealingly engage corresponding structures on the box 270 about the periphery of each of the cover 200 and the junction box 270. As with the single outlet embodiment, the overall dimensions of the cover 200 match the industry standard for a double outlet box 270, but may readily be altered according to the design of the junction box 270. The height of each of the four peripheral walls is greater than the highest point along a vertical distance from the faceplate of the outlet 262 to the tallest feature of the outlet 260. Accordingly, each peripheral wall 290 would have a larger vertical distance for an outlet 260 comprising a toggle switch, compared to an electrical outlet receptacle.

Accordingly, the length and width of the pairs of edges 221, 222 are matched to the dimensions of the corresponding edges 291, 292 of the junction box 270, which is typically, but not necessarily an industry-standard dimension. With appropriate dimensions, sealing engagement is provided when the edges 221, 222 of the cover 200 are brought into conforming engagement with the edges 291, 292 of the box 270. As in the embodiment of FIGS. 1a-1f, recesses 224 may be provided and sized to provide clearance space for structures such as the outlet tabs 262 of the outlet 260 when the cover 200 is engaged with the outlet 270. The recesses 224 are preferably formed in the second edge 222 of the cover 200, but may be formed in any edge structure to accommodate the geometry of the outlet 260 and particularly the outlet tabs 262.

Figure 3:
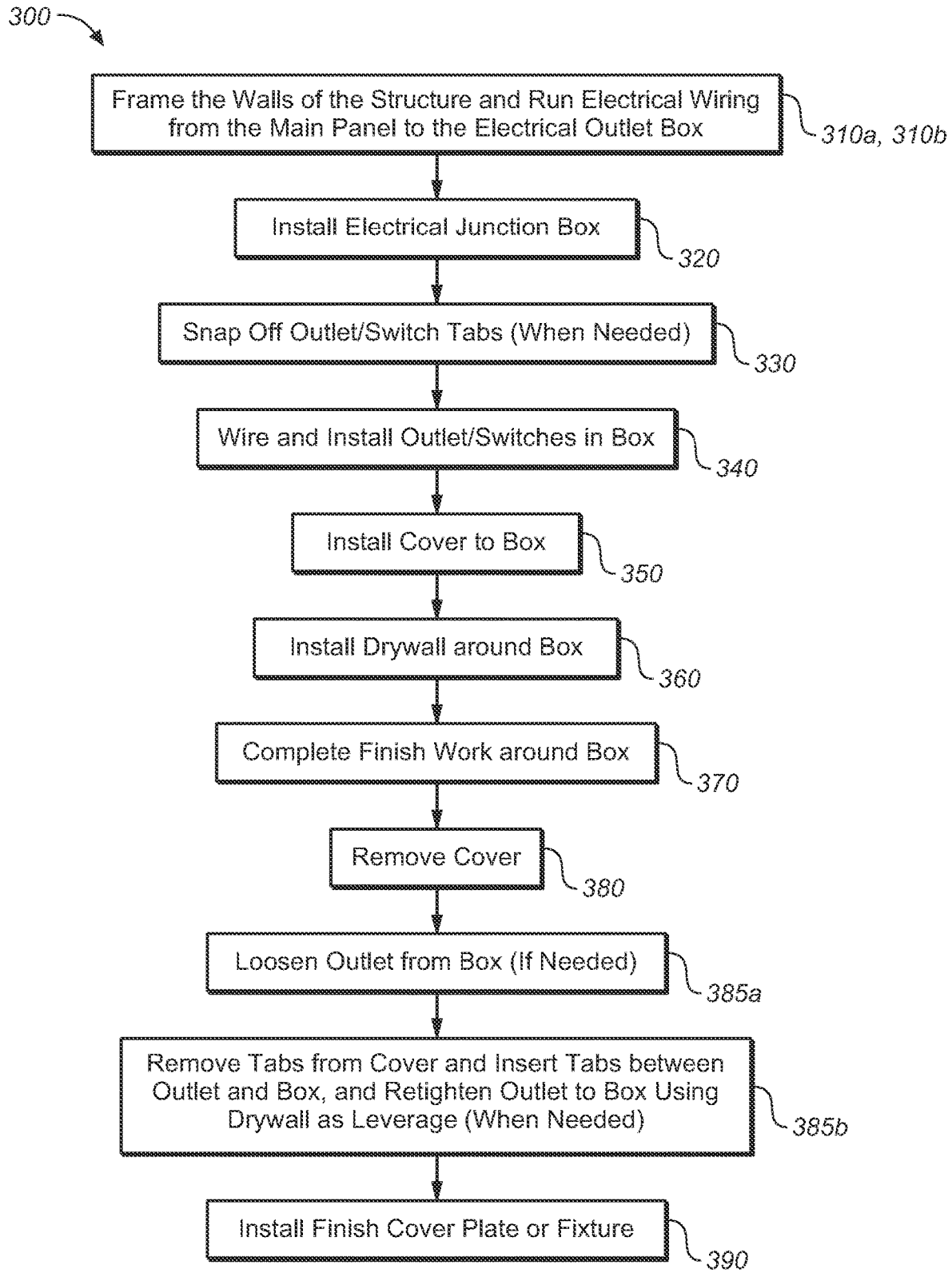
FIG. 3 is a flowchart illustrating one potential method of constructing the assembly described herein, including drywall finishing steps and electrical finishing steps.

FIG. 3 is a flowchart illustrating an embodiment of a method 300 of installing an electrical outlet 160 as described above with respect to FIGS. 1-to 2 and 4-10. The method outline of FIG. 3 assumes that the outlets 160 are wired into the junction box 170 prior to installation of the removable cover 100. As noted above, however, the removable cover can be installed at any point at which a desire exists to protect the internal space of the junction box 170 from contamination with debris. Accordingly, the flow chart of FIG. 3 is exemplary of one embodiment of the invention, and does not restrict performance of the invention to precisely following the steps as indicated, or in the exact order thereof, except as otherwise indicated herein.

Referring specifically to FIG. 3, in step 310a the walls of a structure are erected by framers in a conventional manner requiring only that the frame is adequate to support the electrical junction box 170 as described herein. For example, the walls may be erected using wood or metal studs for walls and wood or metal beams for the ceilings and floors in a conventional manner, as long as these structures provide adequate structural support for attachment of drywall as described herein and placement of the junction box 170.

In step 310b, the electrician runs electrical wiring from a main panel to the desired location of the electrical junction box 170. This is considered a minimal step to establish electrical connection from the main panel to each of a plurality of junction boxes 170. However as is apparent from the disclosure herein, in addition to electrical wiring the step can include establishing a functional connection for data cables, optical fibers, ethernet connections, LAN connections, and any manner of electrical, optical, digital, or other connection that requires establishing a tangible, physical connection to a point of access by an inhabitant of a space who operates a switch, or utilizes an outlet, or performs any other conventional function associated with a junction box 170.

As noted above, the invention also includes an embodiment whereby electrical or data connection is established from a central or main access panel and terminates near, but outside, the enclosure of the junction box 170 such that a pre-assembled junction box/cover assembly 101 can be provided requiring only formation of an electronic or data connection at an intermediate point (outside the junction box 170). In step 320 an electrician attaches the box 170 to the wall studs or ceiling joists and routes the wiring from the main panel to the box 170.

Figure 2A:
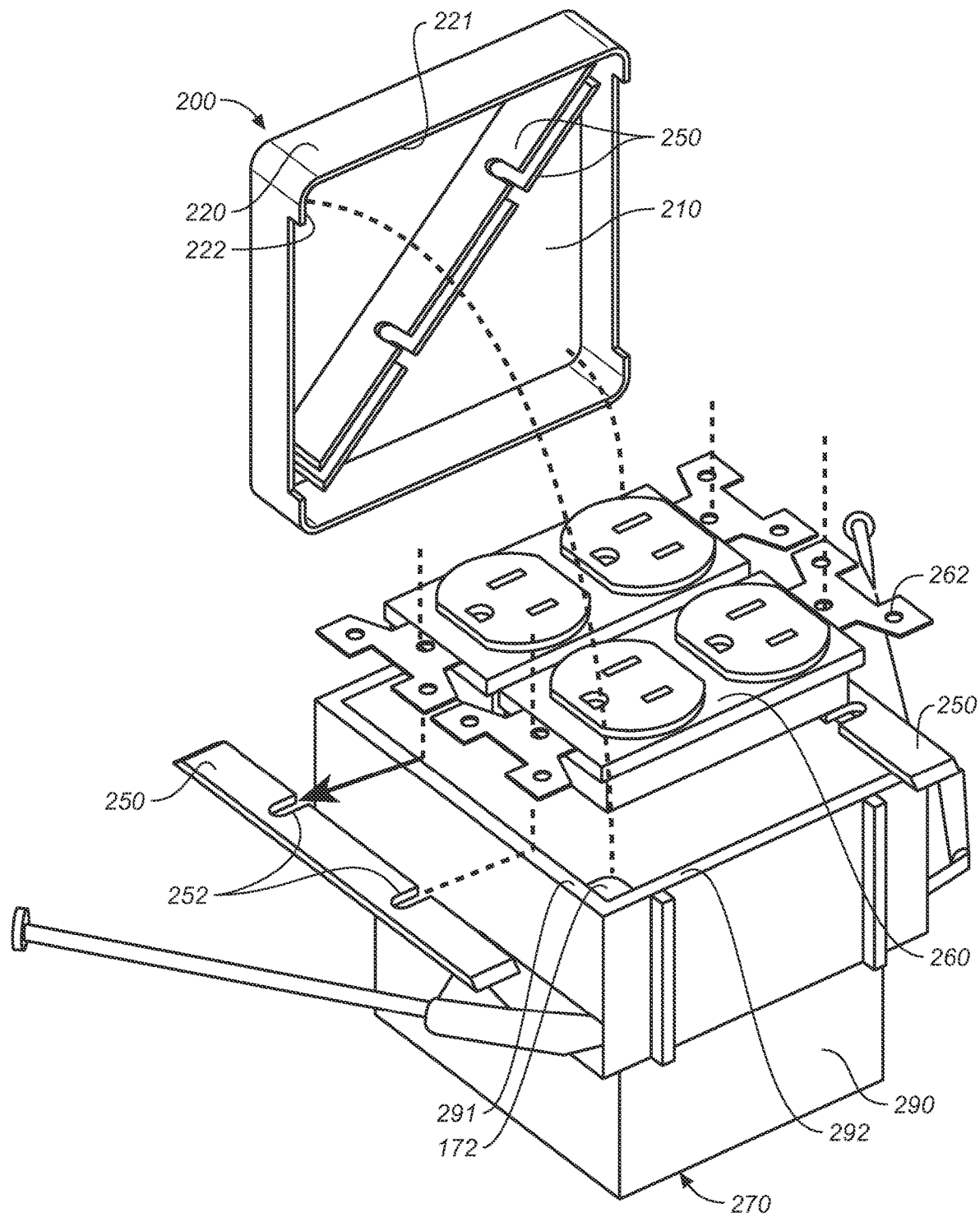
Figure 2B:
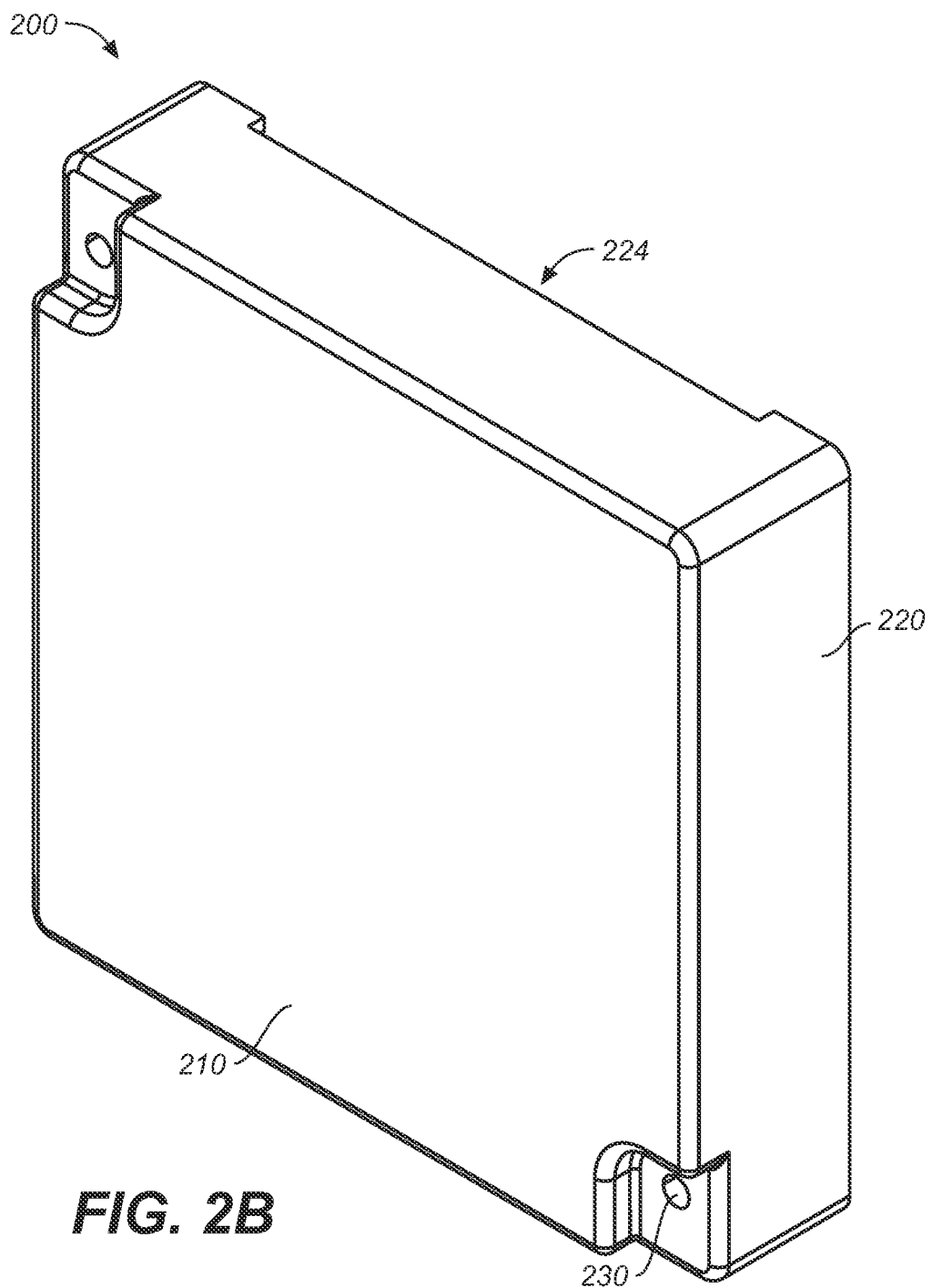
Figure 2C:
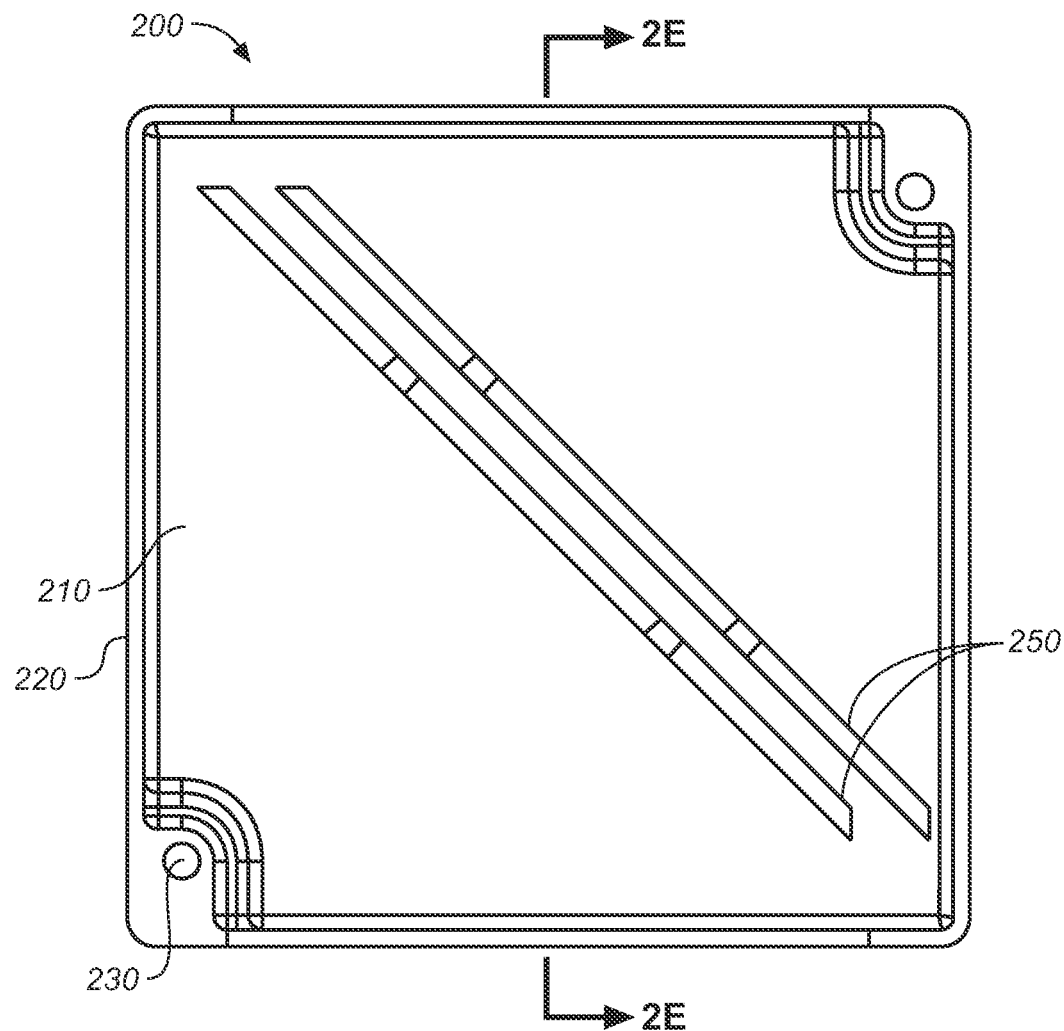
Figure 5A:
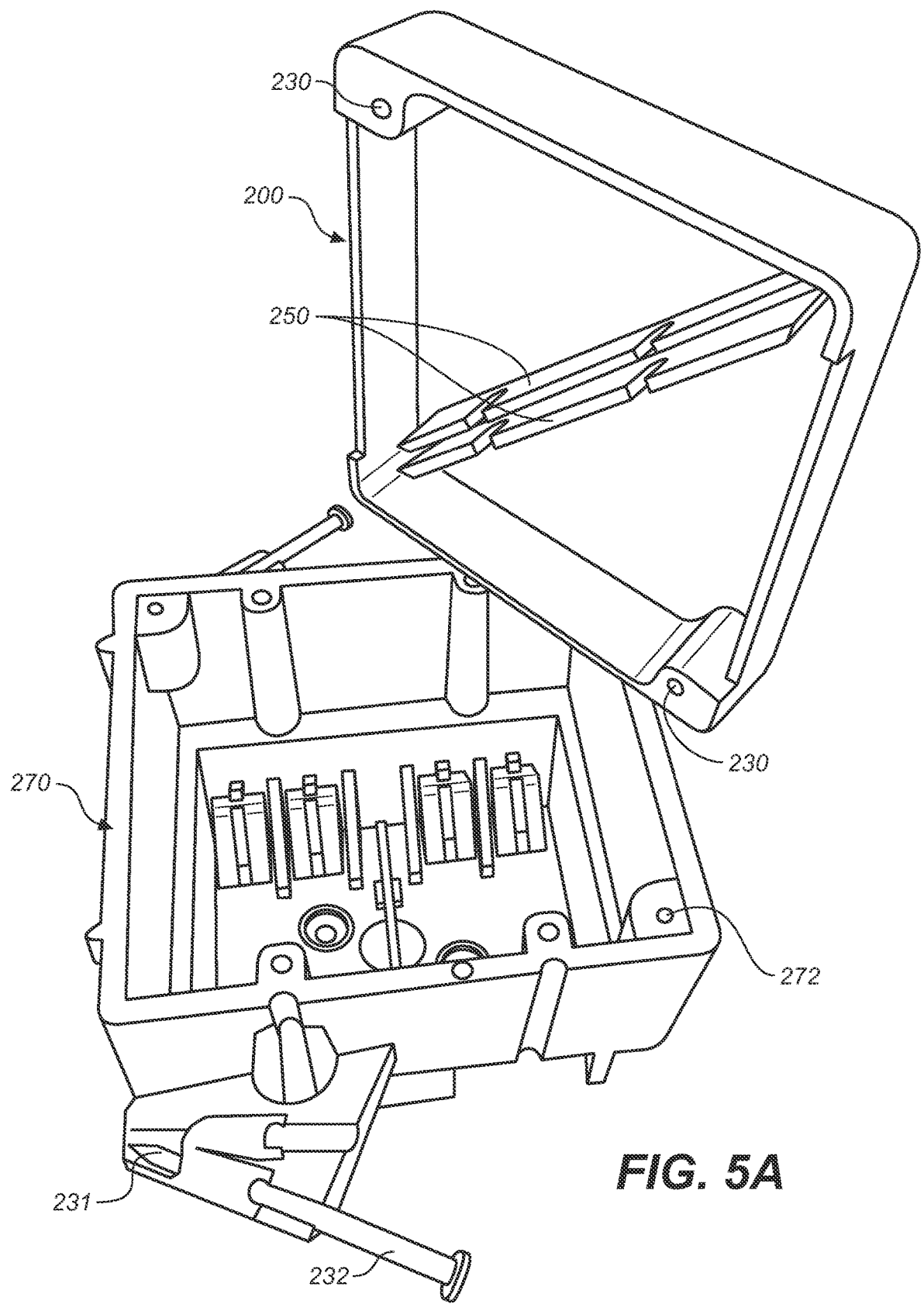
FIGS. 5a-5e illustrate prototypes of the invention that are applicable, but not limited to, residential applications.
Figure 5C:
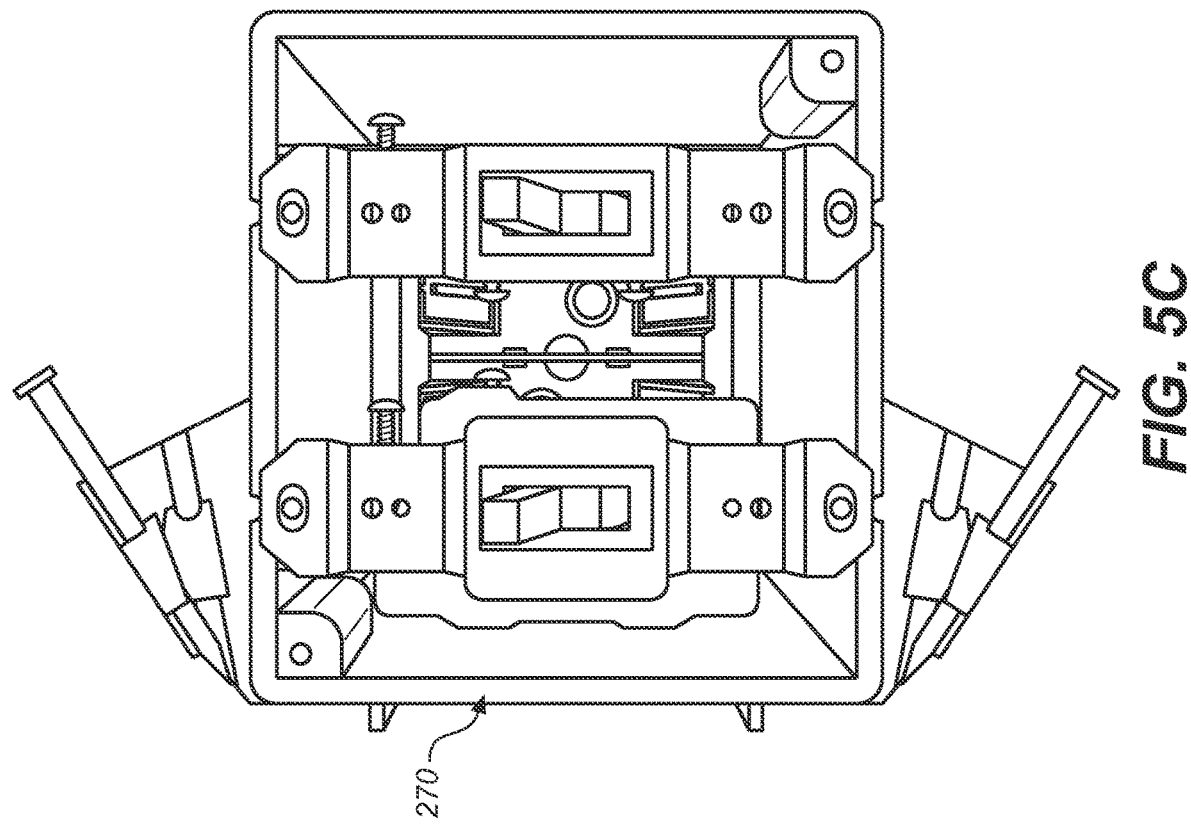

In step 330, the electrician snaps off a portion of the metal outlet tabs prior to installing the outlet 160 in the box 170. The removal of a portion of the outlet tabs 162 gives the drywall installers a cleaner box to work around without any significant protrusions from the outlet 160 sticking out beyond the perimeter of the box 170. The outlet tabs 162, 262 are shown in FIGS. 1a and 2a, and are shown removed in FIGS. 5c-5e. In some embodiments, the outlet tabs 162, 262 are completely broken off for standard outlets and switches. In other embodiments, such as for decora outlets and switches, only the outside portion of outlet tabs 162 are broken off leaving the middle portion of the outlet tab for installation of a faceplate cover later (FIGS. 5c-5e).

In step 340 the electrician installs the outlet in the box. At this point the electrical connection to the main panel is complete and the outlet is hot once the main panel is activated.

In step 350, the electrician installs the temporary protective cover using complementary attachment features on opposite corners of the cover that line up with attachment features on the box.

In step 360, the drywall is installed over the wall studs and the ceiling joists. The installers cut out panels around the boxes that were installed by the electrician. The cover over the box protrudes from the studs sufficiently to ensure that the box is not inadvertently covered during the drywall process.

In step 370, the finish work is completed around the box. The finish work may include taping, mudding, sanding and painting the drywall.

Beneficially, step 380 does not have to be done by an electrician. Step 380 could be completed by a builder's handyman or someone with only general knowledge of outlets at a much lower cost than hiring an electrician. In step 380, the cover is removed by detaching the temporary protective cover from the box (e.g., by removing the fasteners in the opposite corners of the cover that attach the cover to the box).

In step 385a, the outlet is loosened (but not removed) from the box.

In step 385b, the breakaway reinforcement tabs are removed from the inside of the cover (e.g., broken off) and then placed between the outlet and the box at the top and bottom of the outlet. When needed, the outlet(s) are then tightened back to the box with the tabs creating a stable installation of the outlet against the box (FIGS. 5d and 5e).

In step 390, the final finished cover or fixture is installed over the outlet to complete the process.

In some embodiments, the cover 100 includes reinforcement tabs 150. Reinforcement tabs 150 may be breakaway reinforcement tabs 150 that can be detached from the cover 100 and used to stabilize the outlet 160 attachment to the box 170. Detachment of the reinforcement tabs from the cover 100 may occur by bending and fracturing the connection of the reinforcement tab 150 to the cover 100. The connection of the reinforcement tabs 150 to the cover 100 may be similar in geometry to a living hinge, as is known in the art of plastic injection molding.

The breakaway reinforcement tabs 150 are molded into the box 170 or the cover 110 and typically project up from a bottom surface or side surface of the box 170 or cover 110. Once broken off, the reinforcement tabs 150 are inserted between the outlet 160 and the box 170. Placement of the reinforcement tabs 150 between the outlet 160 and the box 170 provides a solid reaction surface for the installed outlet 160 to be secured against. In some embodiments, the reinforcement tabs 150 each include one or more slots 152 to accommodate fastening the outlet 160 to the box 170 and include a receiving abutment (not shown) to slots 152.

Referring to FIGS. 4a-4e, a residential embodiment of the combination cover 100 and box 170 is shown revealing internal structures of each. The embodiment features reinforcement tabs 150 projecting up from an interior surface of the cover 110 along the long axial length thereof. The second pair of edges 122 each have recesses 124 to accommodate placement of an outlet 160, including outlet tabs 162 therein. The embodiment of FIG. 4a also features a holding fixture 131 for easy attachment of a fastener 132. The holding fixture 131 is molded into an external surface of the Box 170 for easy access when releasably engaging the cover 100 to the box 170. In this embodiment, the attachment function is performed by simply removing the fasteners 132 from the holding fixture 131 and passing the faster 132 through the openings in the attachment means 130 to reversibly secure the cover 100 to the box 170. When attached, the conforming edge pairs 121, 122 and 191, 192 will effectively seal the interior contents of the box against contamination and debris. The interior of the box 170 shows ports 151 molded into the rear surface of the box 170. The ports 151 are comprised of an opening temporarily closed with a snap tab 152 that is removable to allow electrical wiring or data cabling to be inserted into the box 174 for operative or functional attachment to outlet 160.

Figure 4F:
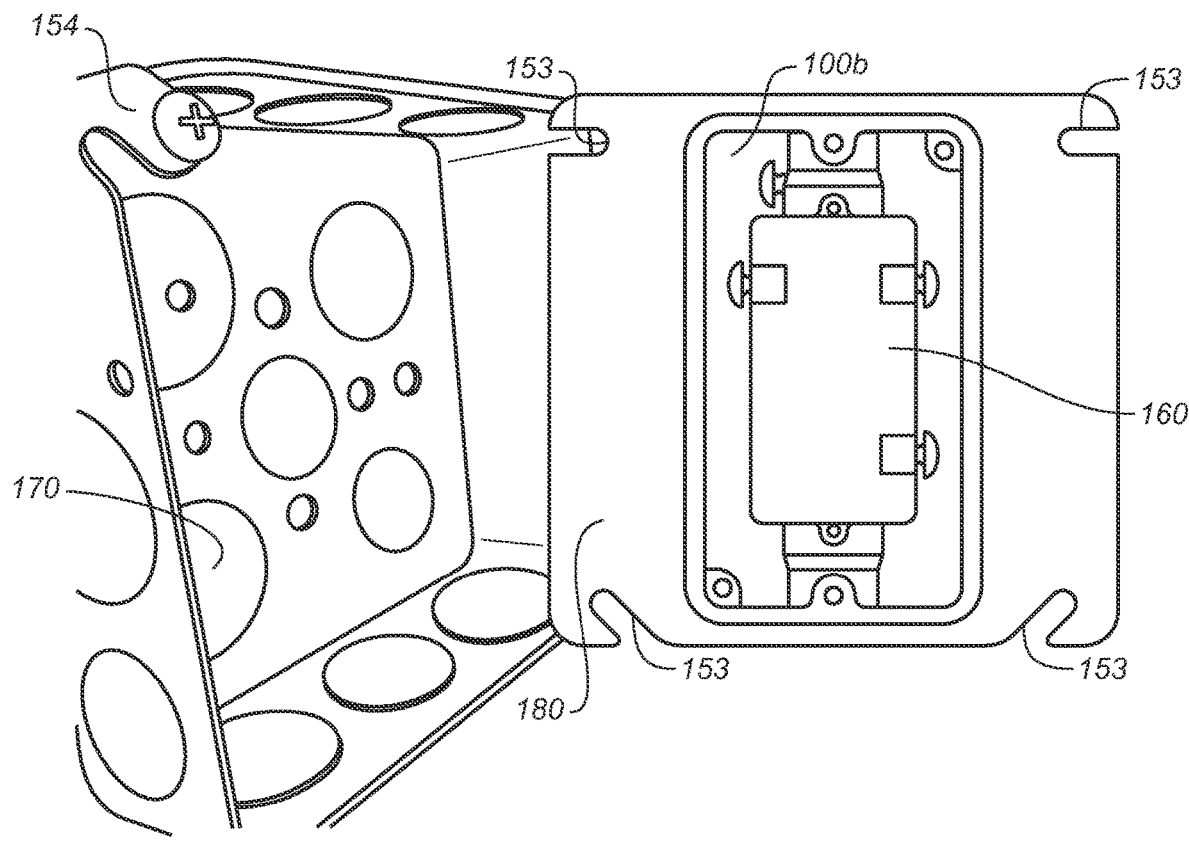
Figure 4G:
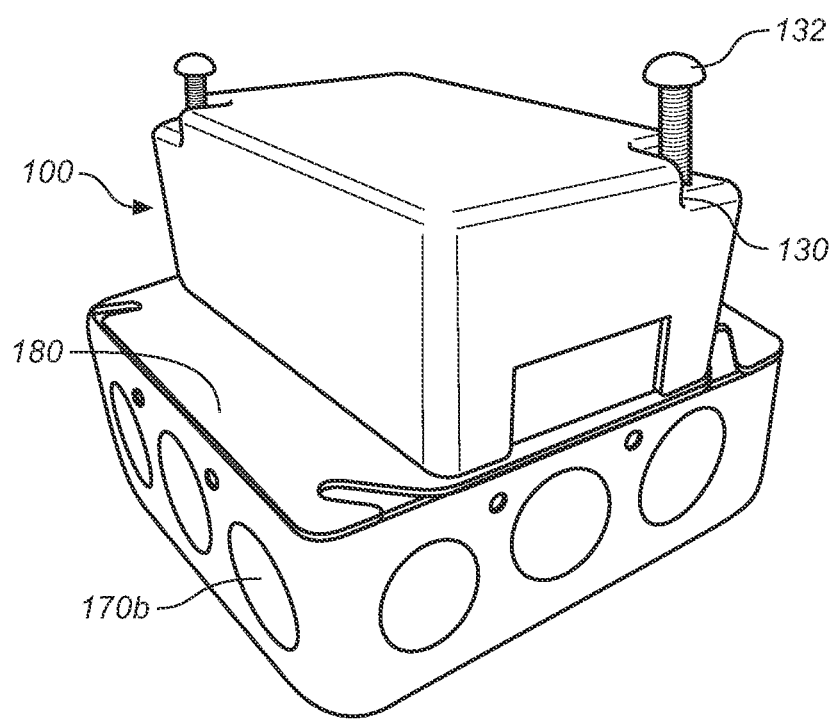

FIGS. 4f-4g are atypical commercial embodiment showing a junction box plastering 180 (or "mud ring") attached to an outlet 160. The exterior of the plastering ring 180 contains mating fixtures 153 that match corresponding attachment points 154 on the box 170. As illustrated in FIG. 4g, by aligning the mating fixtures 153 with the attachment points 154 the combination of the box 170 and plastering ring 180 securely locates the outlet 160 in the combined assembly. To protect the outlet 160, cover 100 is oriented above the outlet 160 and fastener 132 is passed through the attachment fixture 130 to secure the combined assembly.

Figure 5B:
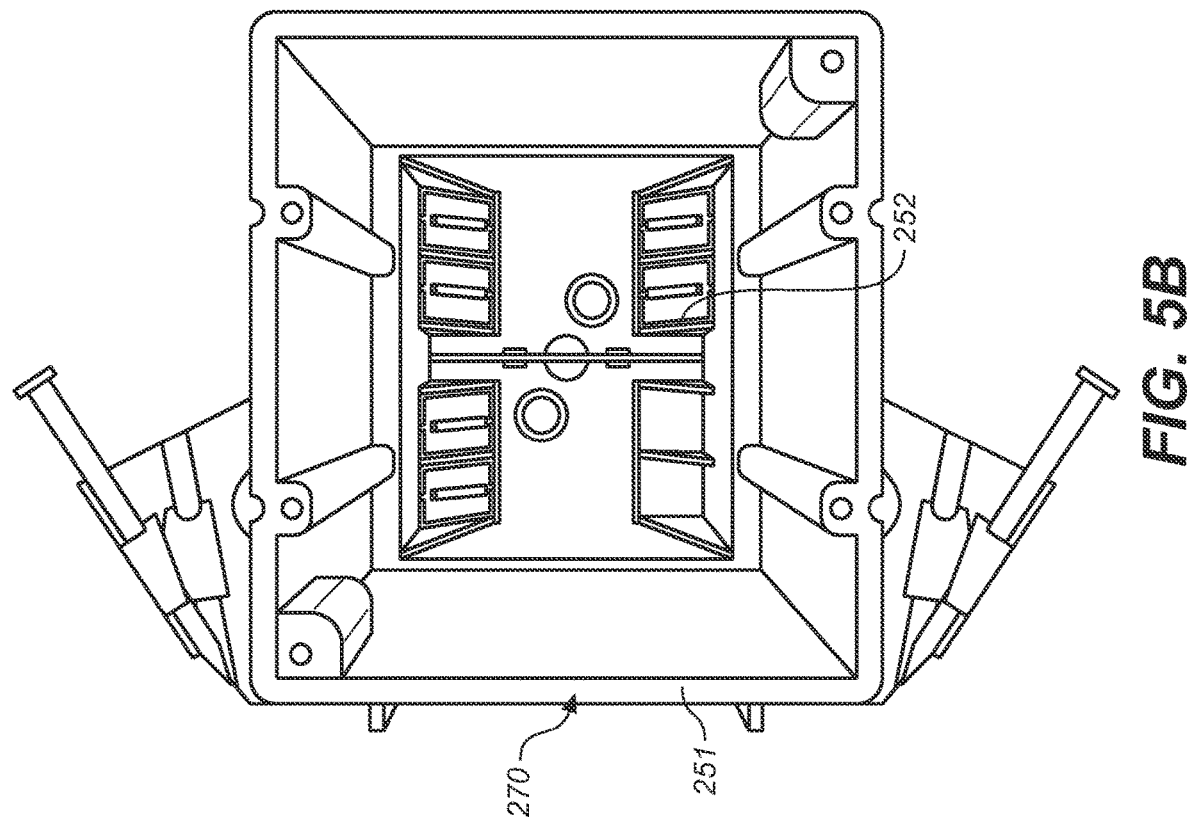
Figure 5D:
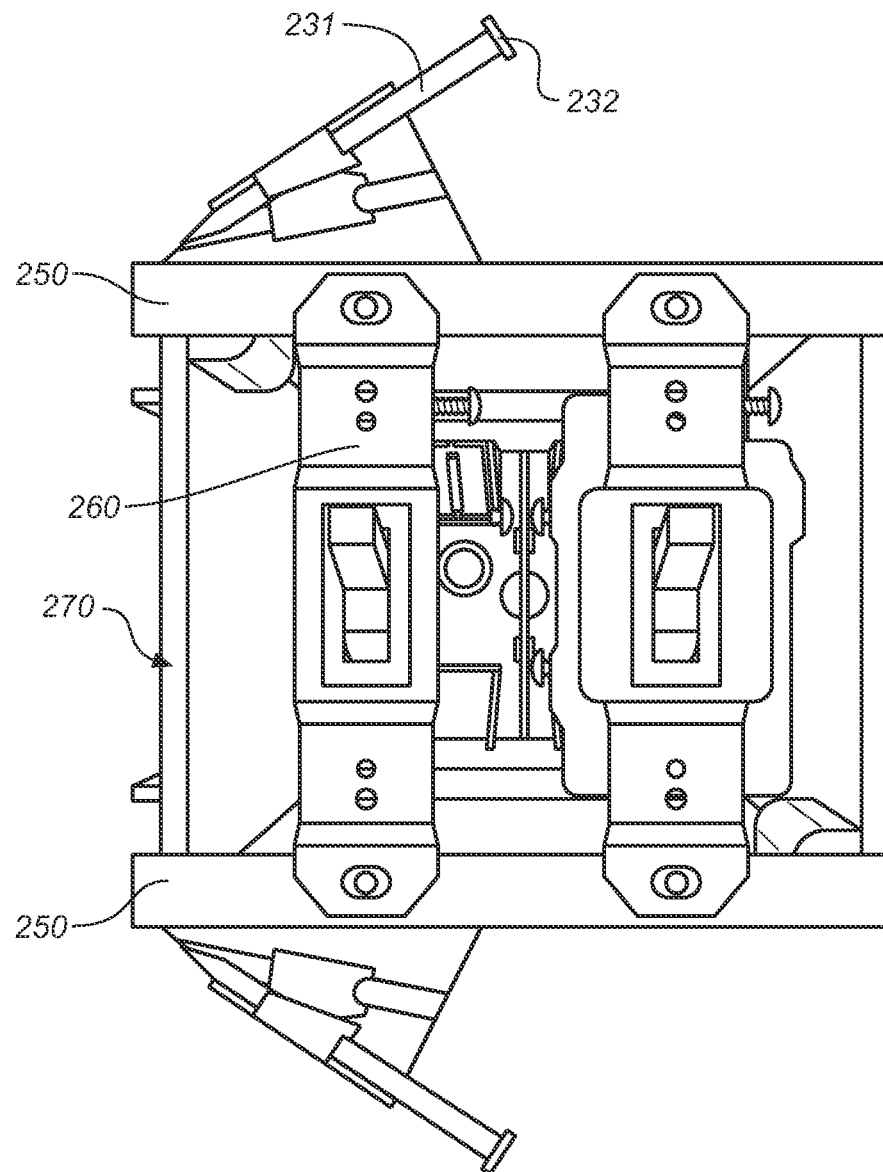
Figure 5E:
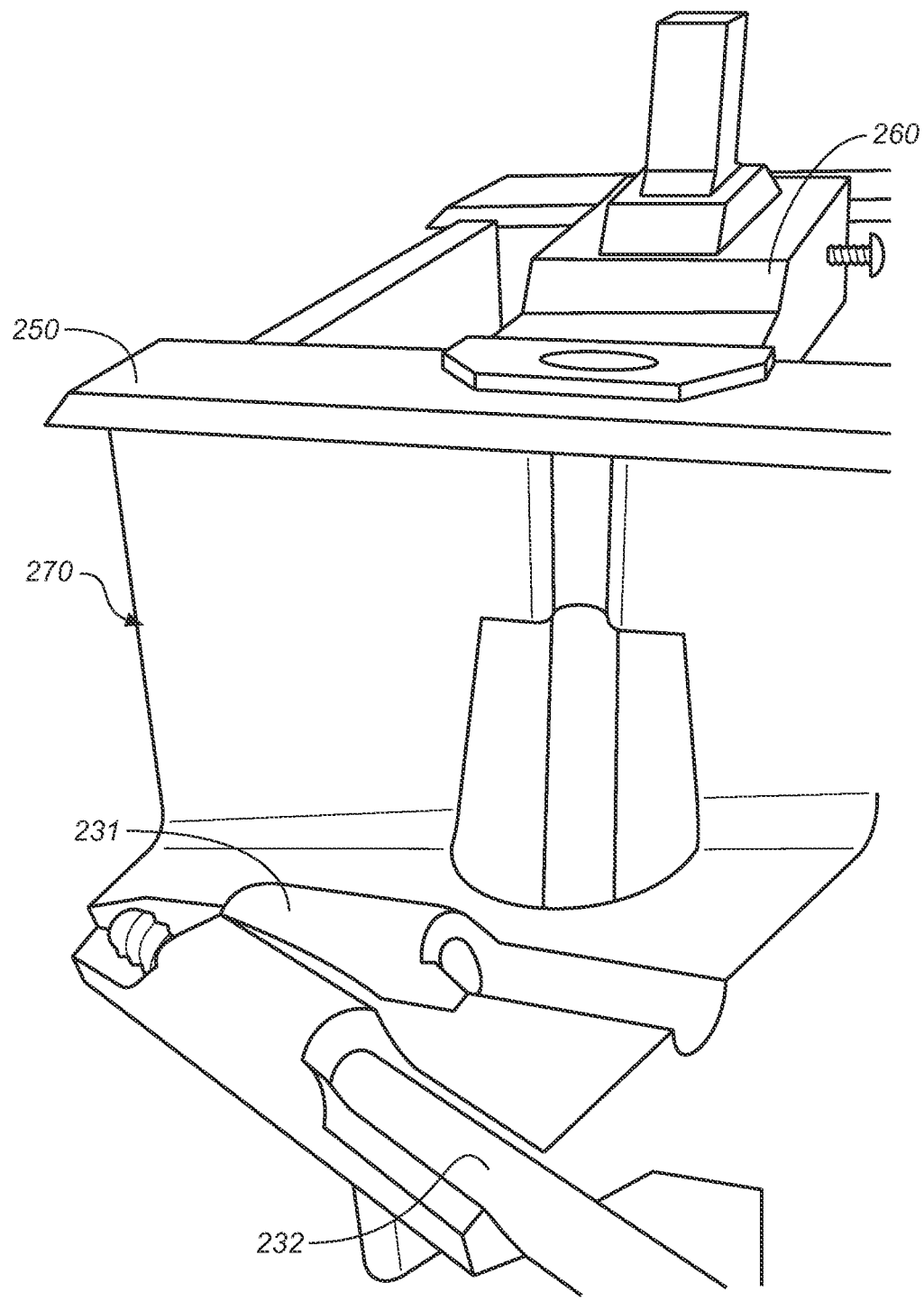

Referring to FIG. 5a-g, a double outlet embodiment is comprised of a holding fixture 231 affixed to the external portion of a peripheral wall 290 of the box 270. The reinforcement tabs 250 are disposed in a transverse orientation on the interior surface of the cover 200. The attachment fixture 272 is disposed at opposite corners of the box 272 engage with the attachment means 230 of the cover 200. FIGS. 5b and 5c reveal a box 270 having ports located in a bottom surface of the box 270 and having snap tabs 252 removed from a pair of the ports 151 for insertion of electrical wiring or data communication cabling. In FIG. 5c, a pair of outlets to 60 are shown in a conventional orientation within the box 270.

Figure 5F:
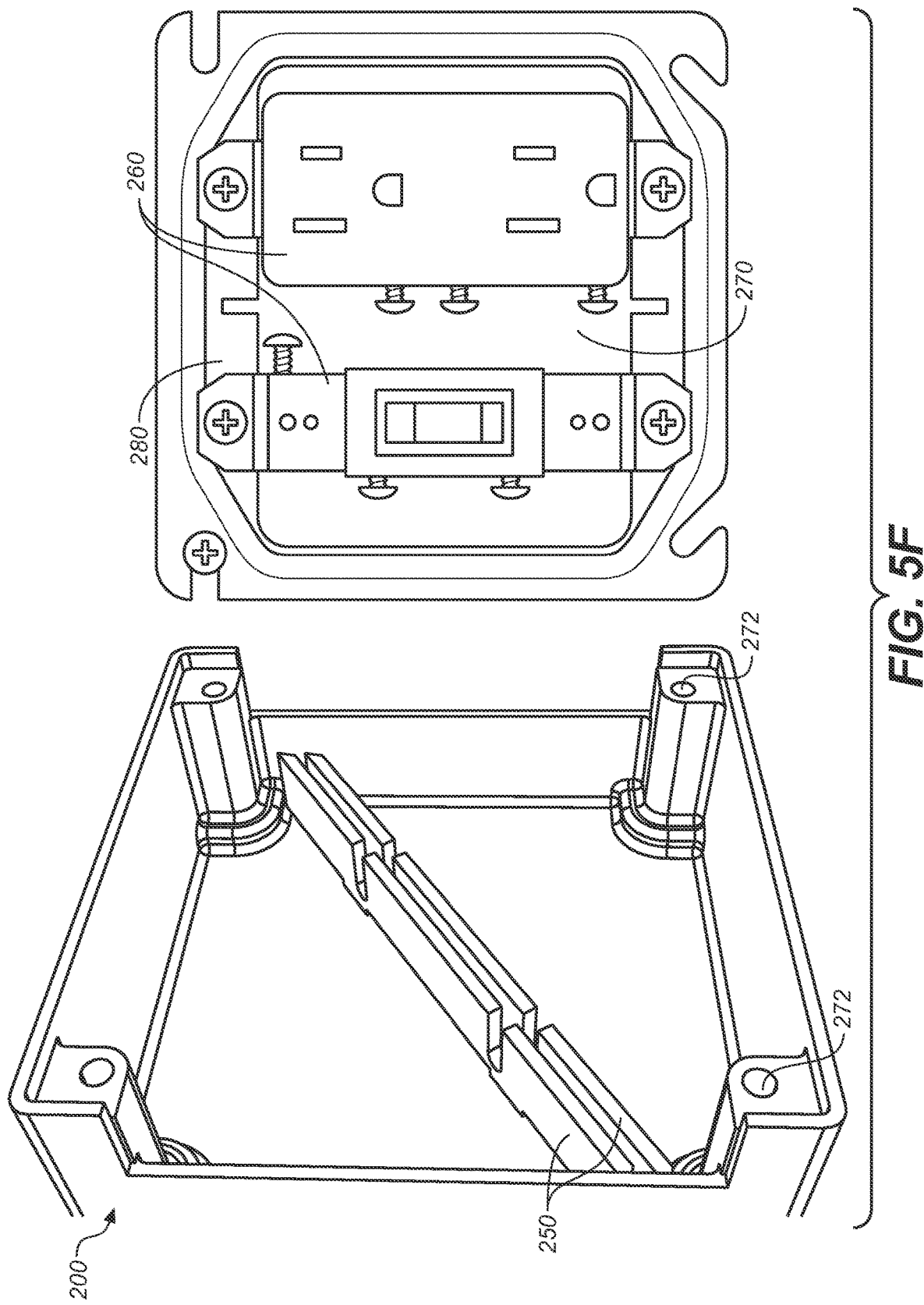
FIGS. 5f-5h illustrate prototypes of the invention that are applicable, but not limited to, commercial applications.
Figure 5G:
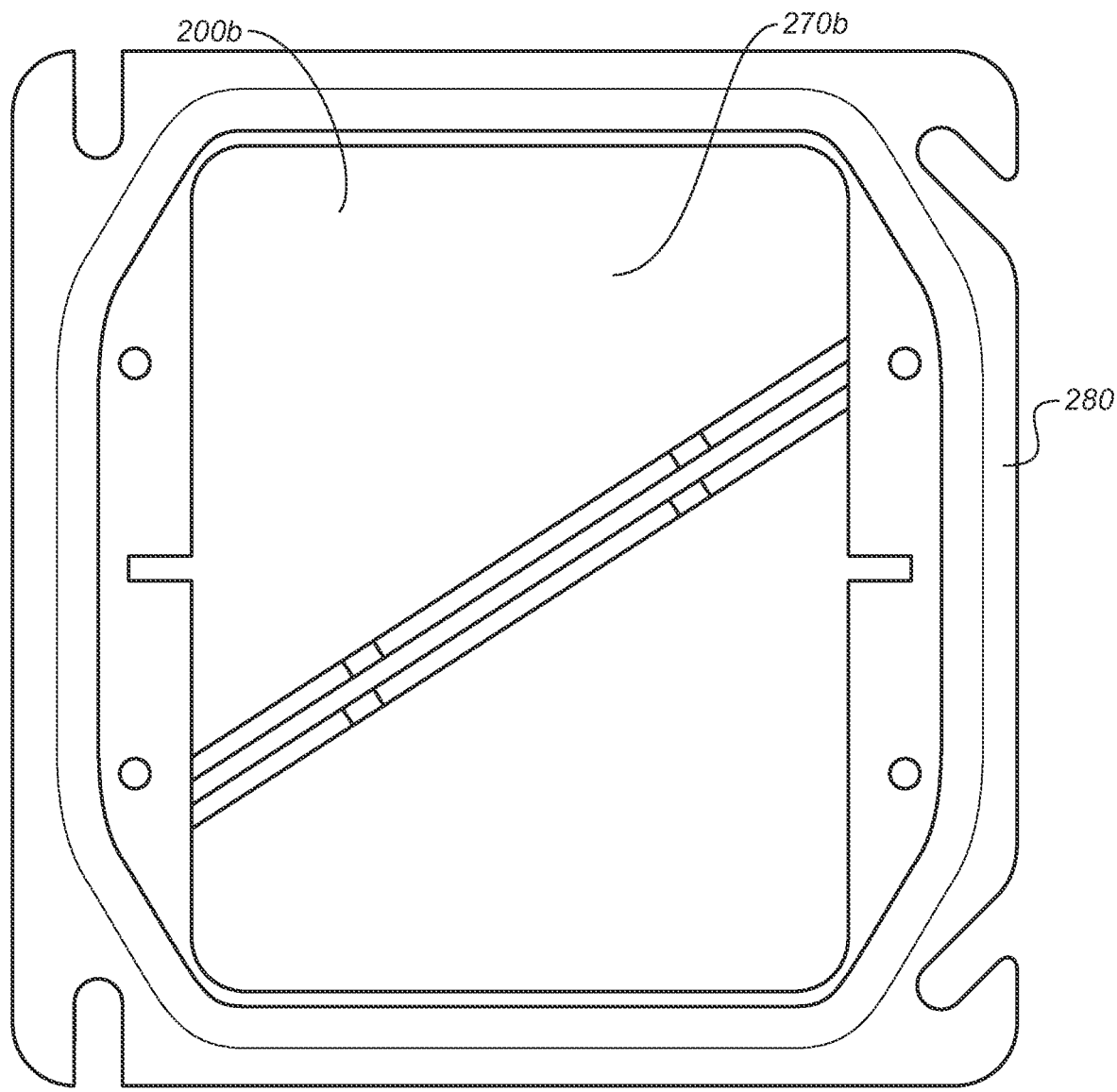
Figure 5H:
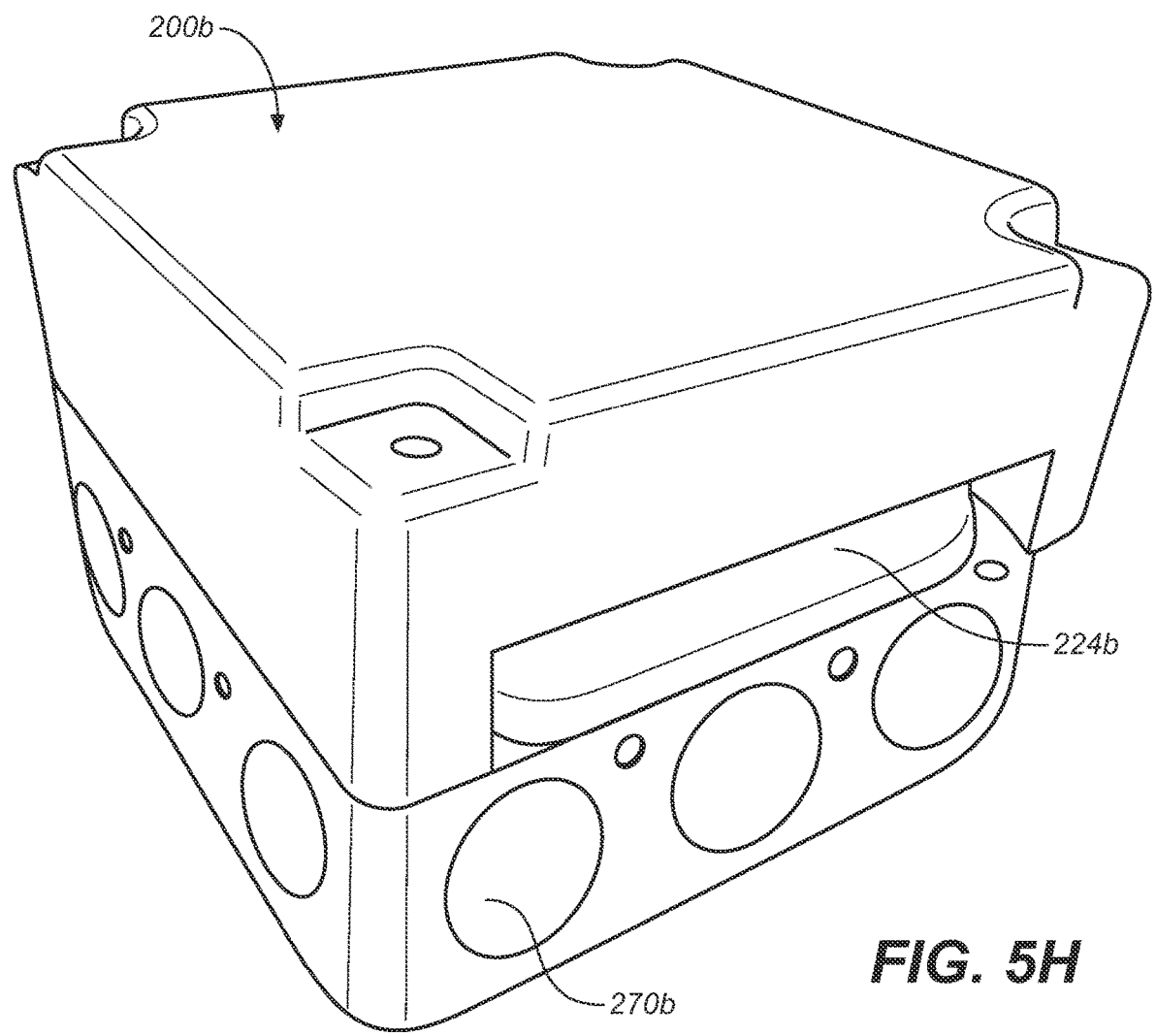

FIG. 5f shows an embodiment including additional attachment features 272 positioned such that a fastener 232 (not shown here) would traverse the cover 200 and engage empty mating fixtures 253 on the plastering ring 280.

Figure 6A:
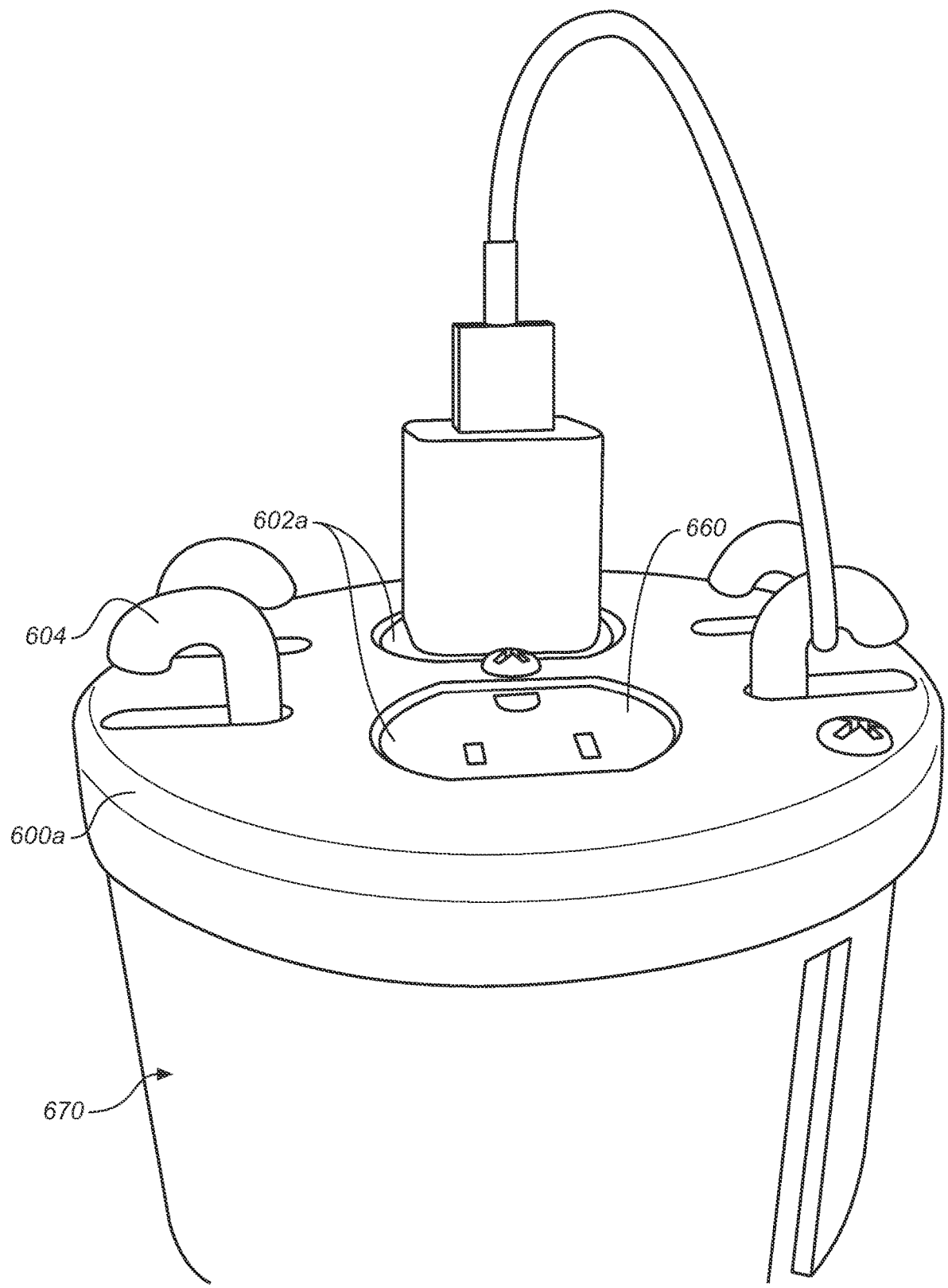
FIGS. 6a-6b illustrate a round electrical junction box and a round temporary protective cover.
Figure 6B:
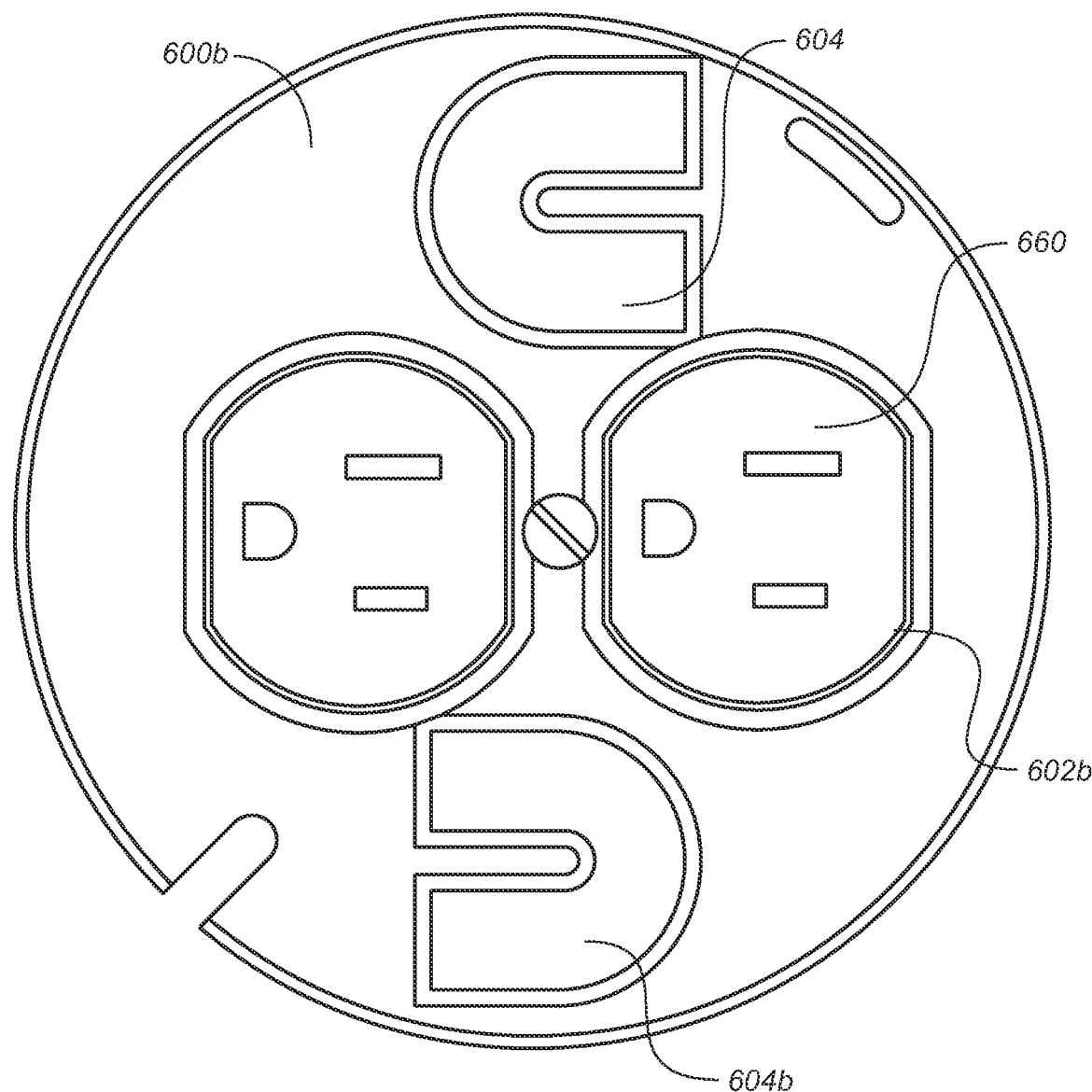

FIGS. 6a and 6b illustrate embodiments for covering round electrical junction box 670. The round electrical junction box 670 may be temporarily covered and protected by a corresponding round electrical junction box cover 600a (FIG. 6a), 600b (FIG. 6b). Electricians install one of the round electrical junction box covers 600a, 600b having outlet inserts 602a, 602b and hooks 604a (FIG. 6a) or cutouts 604b (FIG. 6b) over the outlet 660. The hooks 604a or cutouts 604b provide geometry to hold the wire of the outlet 160 that is plugged into it in place, when the wire is snaked through at least one of the hooks 604a or cutouts 604a. In some embodiments this allows other tradespeople to have temporary power throughout the house during the course of construction as compared to using the one outlet typically supplied during rough in or using a temporary electrical pole with power.

Figure 7A:
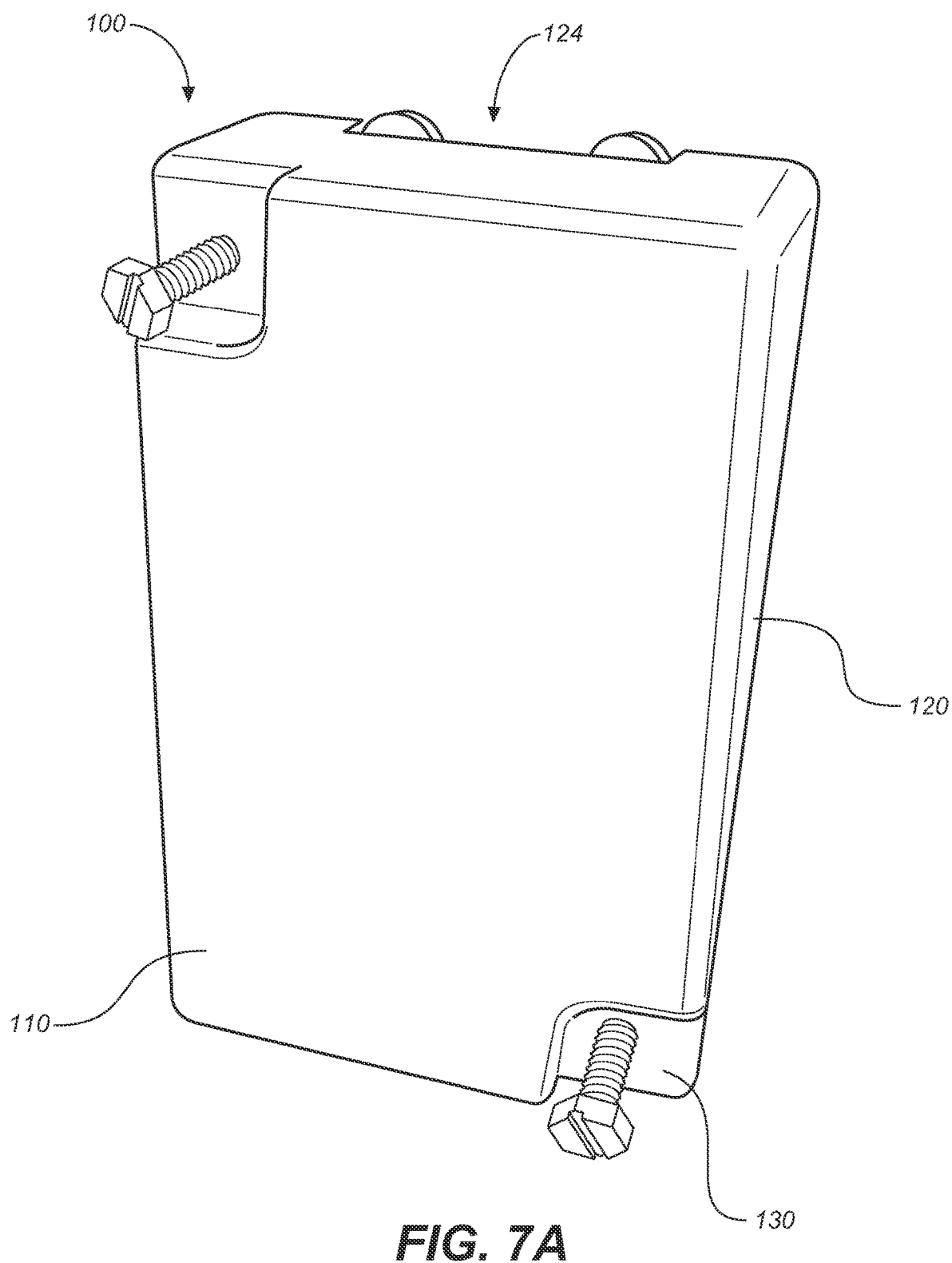
FIGS. 7a-7b illustrate a temporary protective cover secured to an electrical junction box with drywall installed around the electrical junction box pursuant to the invention.
Figure 7B:
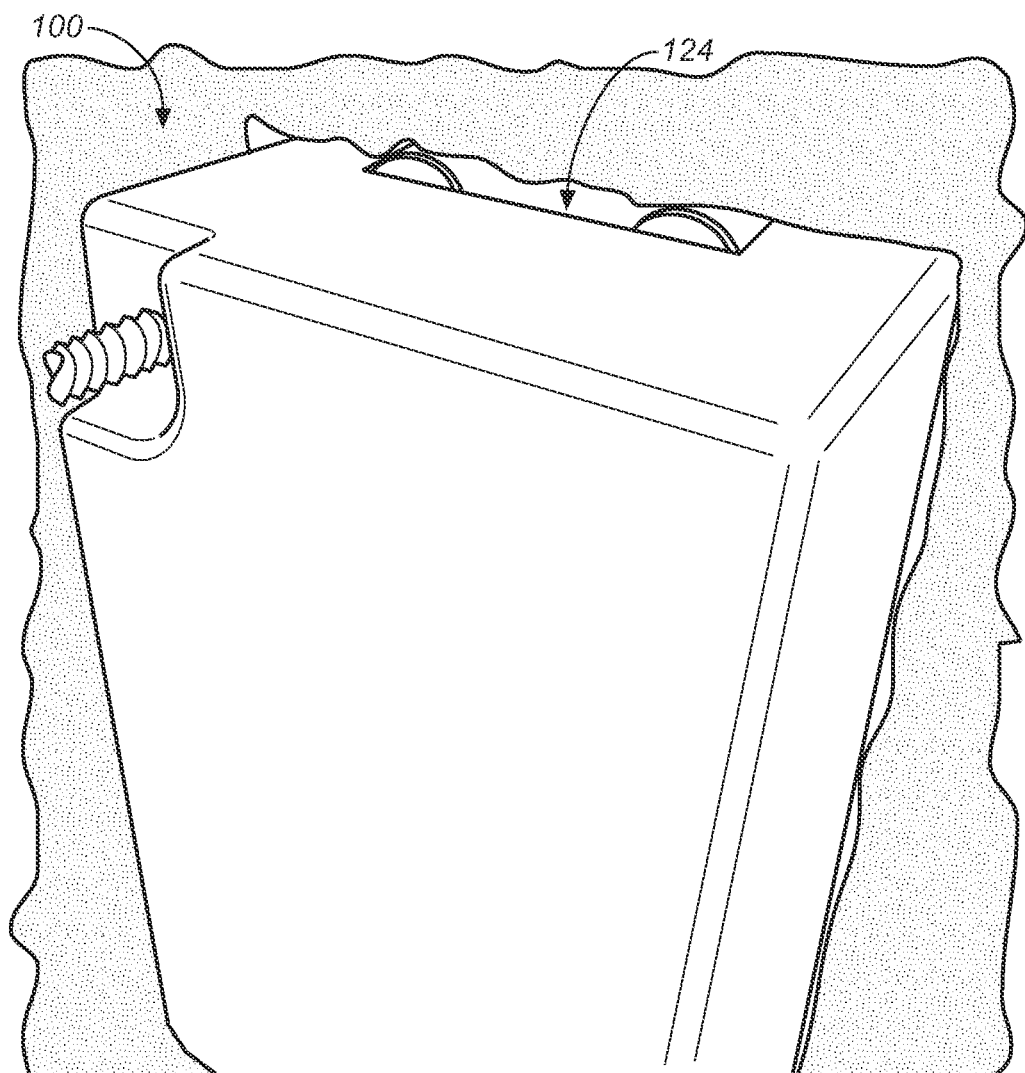

FIGS. 7a-7b are photos of an illustrative prototype of a temporary protective cover secured to an electrical junction box with drywall installed around the box according to embodiments of the invention.

Figure 8A:
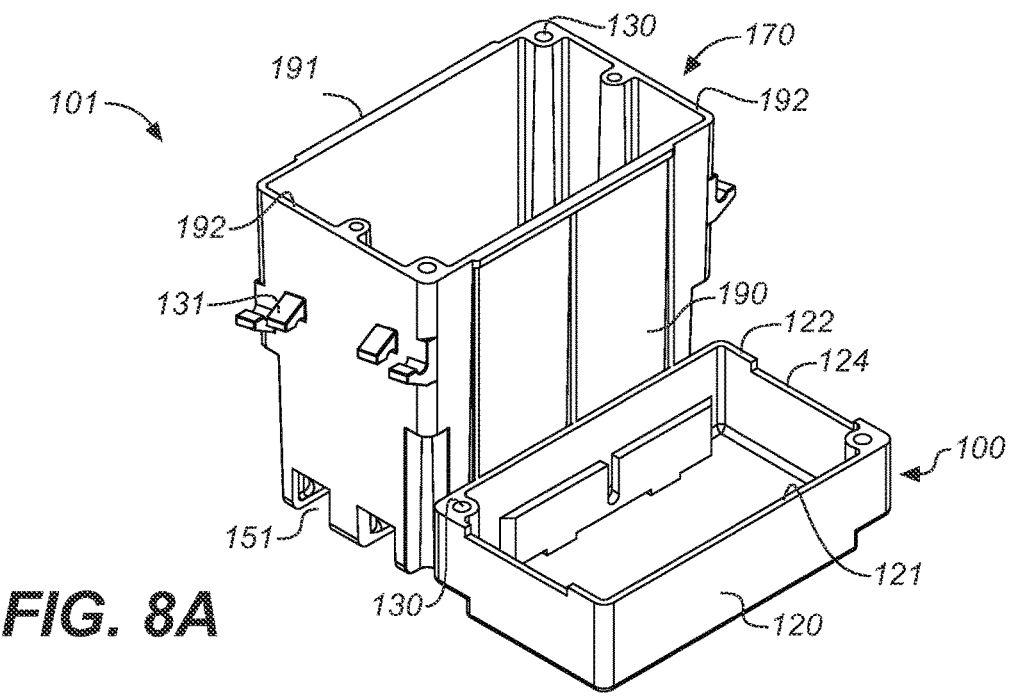
FIGS. 8a-8c are a combination cover and box with the cover attached as a break away component and designed to house a single outlet.
Figure 8B:
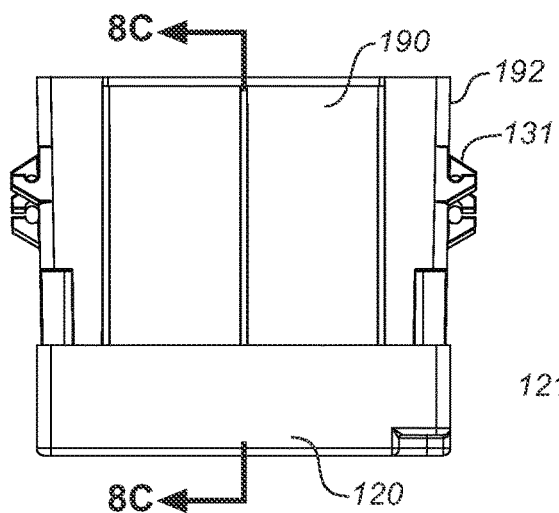
Figure 8C:
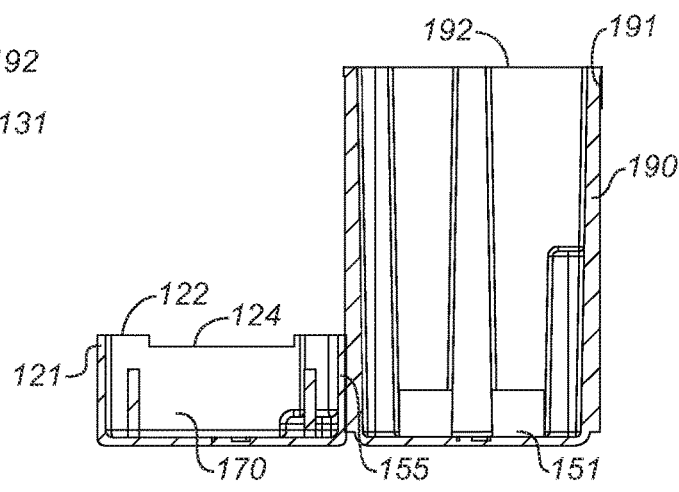

Referring to FIGS. 8a-8c, the invention includes a combined assembly 101 having a box 170 attached to a cover 100 by a breakaway fixture 155 that allows the manufacture of the combined assembly 101 by molding a unitary structure wherein the box 170 and the cover 100 can be readily separated and utilized as described above.

The breakaway fixture 155 is any structural feature that allows ready separation of the cover 110 from the box 170 by manually separating the two components by hand. Typically, one simply grasps each component, rotates the components around an axis formed by the break away component 155 and physically separates the two pieces. A number of simple expedients are known for such a function, including a living hinge as described above, a perforated then, plastic molded segment, or any of a number of breakaway tabs provide this function.

Figure 9A:
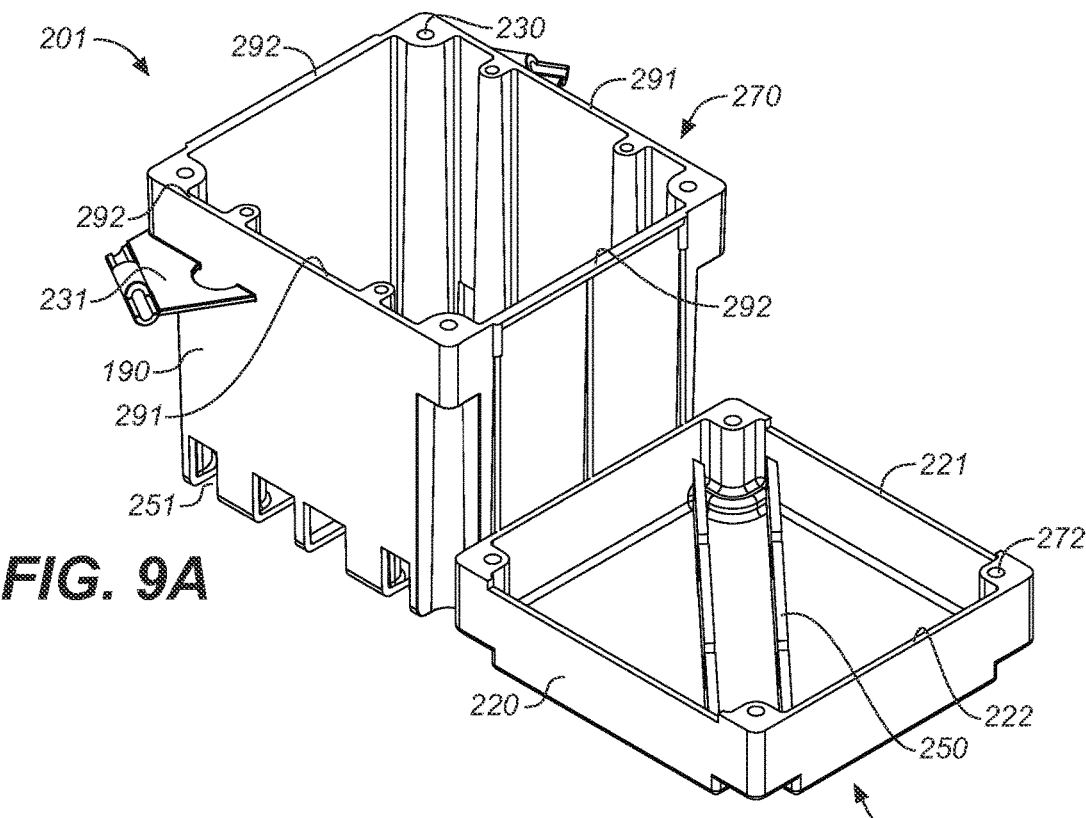
FIGS. 9a-9c are a combination cover and box with the cover attached as a break away component and designed to house dual outlets.
Figure 9B:
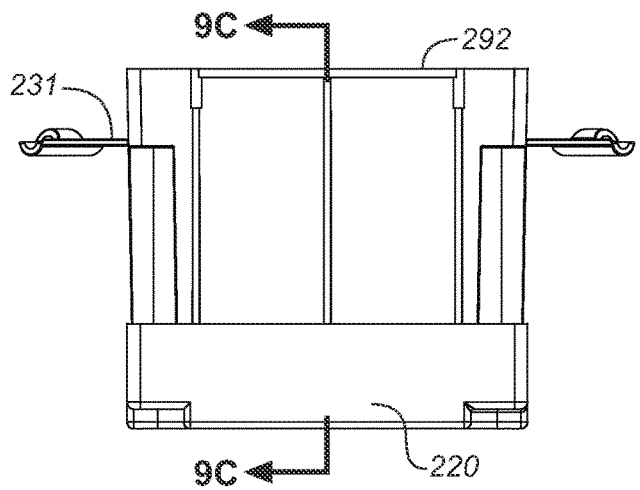
Figure 9C:
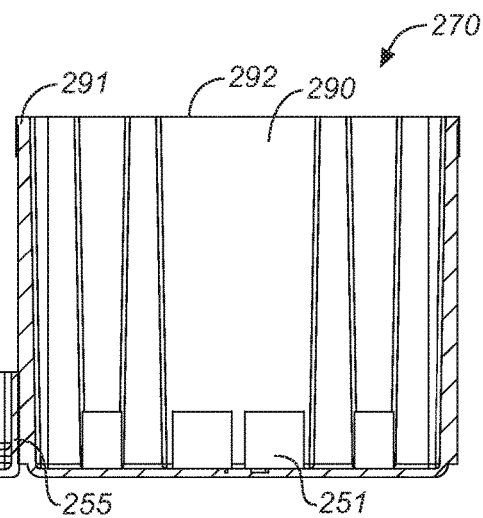

As in the above-described embodiments, the edges of both the cover 100 and the box 170 are sized and oriented to fit into conforming engagement about the periphery of each edge. In use, the user simply breaks structure 155 to separate the cover 100 from the box 170 and assembles the wiring and electrical components as described above. FIG. 8c, is a cross-section view around line 8C of FIG. 8B. FIGS. 9a-9c are a dual outlet embodiment of the combination component of FIGS. 8a-8c.

The advantage of the combination component is that the appropriately-sized corresponding cover 200 is molded at the same time as the box 207 and so the conforming engagement between the box 270 and the cover 200 is assured. Careful control of the molded dimensions ensures that the breakaway fixture 155 attachment means between the cover 200 and the box 270 are in excellent alignment and ensures a secure assembly of the final combination.

For the embodiment of FIGS. 8a-8c and 9a-9c, the user typically follows the steps of introducing electrical wiring or communication cabling through the port 151, 251 and then attaches the wiring/cabling to the outlet 160, 260. Attachment fixtures on each of the box 170, 270 are pre-molded to fit standard corresponding attachment fixtures on the outlet 160, 270. Once electrical or data communication connection is made between the wiring and the outlet 160, 270, the outlet is affixed to the box 170, 270 and secured in place. The cover 100, 200 is secured in place by virtue of the attachment means 130, at any point at which the outlet 160, 270 is secure. As described below in connection with FIG. 10, the wiring or data communication cabling may have a relatively short lead terminating at an intermediate end and of a length that is suitable to be contained within the box 170, 270. Preferably, this short wiring/cabling lead terminates in a simple connector, but may be left as a bare wire or cable. For mass assembly, the short wire/cable lead can be folded or coiled up, reinserted through port 151, 251 such that the entire wiring assembly is contained within the box 170, 270. At any point following placement of the cover 100, 200 in conforming engagement with the box 170, 270, the attachment means is used to secure the cover 100, 200 to the box 170, 270. Upon secure engagement, such as with fastener 132, 232, the entire assembly can be shipped and is ready for installation at a building site.

Figure 10:
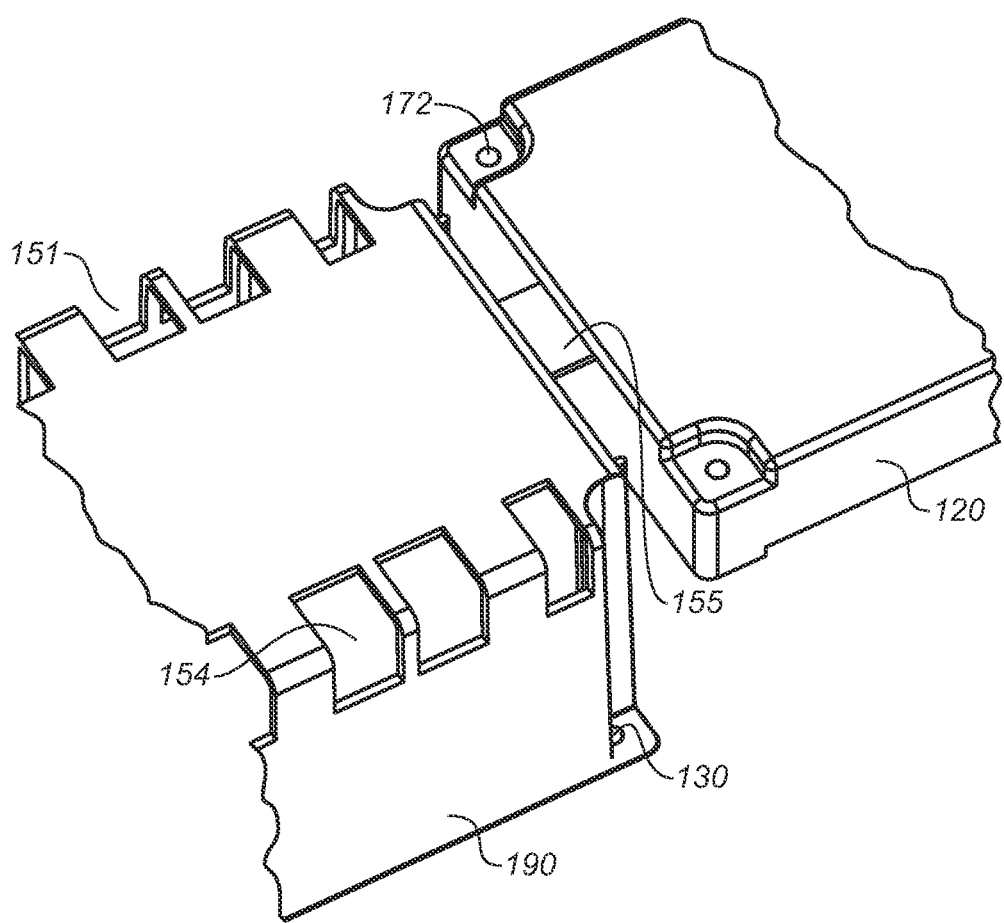
FIG. 10 illustrates the connection of the combination cover and box having a break-away attachment [structure] and sealable closures and/or ports for containing completed wire or cable connections within the interior of the assembled box and cover.

Referring to FIG. 10, as noted above, the breakaway fixture 155 is any simple molded structural expedient that allows ready separation of the box component 170, 270 from the cover component 100, 200. An option for the port 151, 251 is either an open structure that is created, such as with the snap away tabs 152, 252 or may be created to be resealable such as closure 154 that can be opened for insertion of the wiring/cabling into the housing of the box 170. In such an embodiment, the method of assembly simply includes opening the closure 154, connection of the wiring/cabling to outlet 160, 170, followed by placing the entire electrical/cabling lead (and optionally half of a connector pair) within the housing of the box 170, 270 and closing the closure 154. The cover 100 and box 170 are assembled in the same fashion as described above. However, when the combined component is used at the building site, the user simply opens closure 154, retrieves the intermediate and of the wiring/cabling and attaches the wiring/cabling to the pre-existing wiring/cabling that is already in place at the wall, ceiling, or other rough structure at the building site. At this point the entire electrical assembly, with the cover 100 in place, is ready for installation of the drywall around the entire component assembly, requiring only removal of the cover 100 and the installation of a cosmetic or decorative cover plate to complete the entirety of the wiring/cabling and the outlet 160, 270 installation process.

Various examples have been described and photos of prototypes including features of the embodiments have been provided. These specific examples and other examples are within the spirit of the invention are within the scope of the following claims.

I claim:

1. An assembly, comprising:
   an electrical junction box including a housing comprising an opening surrounded by a wall, with said wall having a peripheral housing edge opposite a substantially closed end to form an open enclosure with an interior; and
   a temporary cover configured to be releasably connected to the electrical junction box, wherein the temporary cover comprises a substantially closed cover portion and a cover wall extending from the substantially closed cover portion;
   wherein said cover wall having a peripheral cover edge away from the substantially closed cover portion, and said peripheral cover edge including one or more recesses, wherein the one or more recesses extend toward the substantially closed portion to form a non-continuous wall around the peripheral cover edge; and
   wherein the peripheral housing edge and the peripheral cover edge engage in a mating and non-overlapping manner with one another along all of the peripheral housing edge and the peripheral cover edge except for at the one or more recesses.

2. The assembly of claim 1, further comprising wherein when the cover is connected to the electrical junction box the cover substantially encloses the hollow interior of the electrical junction box.

3. The assembly of claim 1, further comprising wherein when the cover is installed on the electrical junction box the one or more recesses are configured to receive tabs of an electrical outlet or switch when an electrical outlet or switch is installed within the hollow interior of the electrical junction box.

4. The assembly of claim 1, wherein the peripheral housing edge and the peripheral cover edge substantially correspond in size and shape.

5. The assembly of claim 1, further comprising one or more apertures in the cover that correspond with one or more apertures in the electrical junction box to facilitate temporary attachment of the cover to the electrical junction box.

6. The assembly of claim 1, further comprising wherein when the cover is installed on the electrical junction box the cover peripheral edge of the cover is configured to engage and align with the peripheral housing edge of the housing of the electrical junction box thereby enclosing the hollow interior of the electrical junction box.

7. The assembly of claim 1, further comprising wherein when the cover is installed on the electrical junction box the cover is configured to enclose an electrical outlet or switch when an electrical outlet or switch is installed within the hollow interior of the electrical junction box.

8. The assembly of claim 1, further comprising a mechanical fastener positioned through both a peripheral housing aperture and peripheral cover aperture to releasably connect the temporary cover to the electrical junction box.

9. The assembly of claim 1, wherein the wall of the housing of the electrical junction box comprises four peripheral walls, and the electrical junction box includes one or more apertures positioned at opposite corners of the housing.

10. The assembly of claim 1, wherein the cover wall of the temporary cover comprises four peripheral walls.

11. The assembly of claim 1, wherein the one or more recesses in the peripheral cover edge comprises two recesses in opposite walls of the temporary cover.

12. The assembly of claim 1, further comprising an electrical outlet or switch disposed at least partially within the interior of the housing of the electrical junction box.

13. The assembly of claim 1, further comprising first and second attachment points in opposing portions of the wall of the housing of the electrical junction box configured to attach an electrical outlet or switch to the housing.

14. The assembly of claim 13 further comprising third and fourth attachment points in the wall of the housing of the electrical junction box separate from the first and second attachment points, wherein the third and fourth attachment points are configured to releasably connect the temporary cover to the housing.

15. The assembly of claim 1, wherein when an electrical outlet or switch is installed in the electrical junction box, a portion of the outlet or switch is positioned within the one or more recesses of the temporary cover.

16. The assembly of claim 1, wherein when an electrical outlet or switch is installed in the electrical junction box, a portion of an electrical outlet or switch is positioned between a portion of the electrical junction box and a portion of the temporary cover.

17. The assembly of claim 1, wherein when an electrical outlet or switch is installed in the electrical junction box, a portion of tabs of an electrical outlet or switch is positioned between a portion of the electrical junction box and a portion of the temporary cover.

18. The assembly of claim 1, wherein when an electrical outlet or switch is installed in the electrical junction box, a portion of tabs of an electrical outlet or switch is positioned between the peripheral housing edge and the peripheral cover edge.

19. The assembly of claim 1, wherein a plurality of electrical outlets or switches are disposed at least partially within the interior of the housing of the electrical junction box, and wherein corresponding portions of adjacent outlets or switches are positioned in a common recess between the temporary cover and the housing of the electrical junction box.

20. An assembly, comprising:
an electrical junction box including a housing comprising an opening surrounded by a wall, with said wall having a peripheral housing edge opposite a substantially closed end to form an open enclosure with an interior;
a temporary cover configured to be releasably connected to the electrical junction box, wherein the temporary cover comprises a substantially closed cover portion and a non-continuous cover wall extending from the substantially closed cover portion; and
an electrical outlet or switch positioned at least partially in the interior of the housing of the electrical junction box with one or more tabs of the outlet or switch positioned between the electrical junction box and the temporary cover when the temporary cover is connected to the electrical junction box; and
wherein the peripheral housing edge and the non-continuous cover wall engage in a mating and non-overlapping manner with one another along all of the peripheral housing edge and the non-continuous cover wall except for at a recess.

21. The assembly of claim 20, wherein the one or more tabs of the outlet or switch are positioned within a recess between the temporary cover and the electrical junction box.

22. The assembly of claim 20, wherein the wall of the housing of the electrical junction box comprises four peripheral walls, and wherein the one or more apertures in the peripheral housing edge are positioned at opposite corners of the housing.

23. The assembly of claim 20, wherein the non-continuous cover wall of the temporary cover comprises four peripheral walls that substantially correspond to the shape of four walls of the housing of the electrical junction box.

24. The assembly of claim 20, wherein the one or more tabs of the outlet or switch are positioned within a recess between the temporary cover and the electrical junction box, and wherein the recess comprises first and second recesses on opposite peripheral walls of the temporary cover.

25. The assembly of claim 20, further comprising a recess in the temporary cover with the recess comprising portions of the wall of the temporary cover that extend from the substantially closed portion less than the rest of the wall.

26. The assembly of claim 20, wherein the outlet or switch comprises a plurality of outlets or switches positioned at least partially in the interior of the housing and mounted thereto.

27. The assembly of claim 20, wherein the wall of the housing of the electrical junction box and the non-continuous cover wall are circular-shaped.

28. The assembly of claim 20, further comprising wherein when the temporary cover is connected to the electrical junction box the temporary cover substantially encloses the hollow interior of the electrical junction box.

29. The assembly of claim 20, further comprising wherein when the temporary cover is installed on the electrical junction box the one or more recesses are configured to receive tabs of an electrical outlet or switch when an electrical outlet or switch is installed within the hollow interior of the electrical junction box.

30. The assembly of claim 20, further comprising wherein when the temporary cover is installed on the electrical junction box the temporary cover peripheral edge of the temporary cover is configured to engage and align with the peripheral housing edge of the housing of the electrical junction box thereby enclosing the hollow interior of the electrical junction box.

31. The assembly of claim 20, further comprising wherein when the cover is installed on the electrical junction box the cover is configured to enclose an electrical outlet or switch when an electrical outlet or switch is installed within the hollow interior of the electrical junction box.

32. The assembly of claim 20, further comprising a mechanical fastener positioned through both peripheral housing apertures and peripheral cover apertures to releasably connect the temporary cover to the electrical junction box.

33. The assembly of claim 20, wherein when an electrical outlet or switch is installed in the electrical junction box, a portion of tabs of an electrical outlet or switch is positioned between the peripheral housing edge and the peripheral cover edge.

34. An assembly, comprising:
an electrical junction box including a housing comprising an opening surrounded by a wall, with said wall having a peripheral housing edge opposite a substantially closed end to form an open enclosure with an interior; and
a temporary cover configured to be releasably connected to the electrical junction box, wherein the temporary cover comprises a substantially closed cover portion and a cover wall extending from the substantially closed cover portion;
wherein said cover wall having a peripheral cover edge away from the substantially closed cover portion, and said peripheral cover edge including one or more recesses to form a non-continuous wall around the peripheral cover edge, wherein the one or more recesses are configured to receive tabs of an electrical outlet or switch when an electrical outlet or switch is installed within the interior of the electrical junction box; and
wherein the peripheral housing edge and the peripheral cover edge engage in a mating and non-overlapping manner with one another along all of the peripheral housing edge and the peripheral cover edge except for at the one or more recesses.

35. An assembly, comprising:
an electrical junction box;
the electrical junction box having an opening surrounded by a wall;
the wall of the electrical junction box having a peripheral housing edge opposite a substantially closed end to form an open enclosure with a hollow interior;
a cover;
the cover configured to be releasably connected to the electrical junction box;
the cover having a cover opening surrounded by a cover wall;
the cover wall having a peripheral cover edge opposite a substantially closed cover end to form an open enclosure with a hollow interior;
wherein the peripheral cover edge includes one or more recesses;
wherein the one or more recesses extend toward the substantially closed cover end to form a non-continuous wall around the peripheral cover edge; and
wherein the peripheral housing edge and the peripheral cover edge engage in a mating and non-overlapping manner with one another along all of the peripheral housing edge and the peripheral cover edge except for at the one or more recesses.

36. An assembly, comprising:
an electrical junction box;
the electrical junction box having an opening surrounded by a wall;
the wall of the electrical junction box having a peripheral housing edge opposite a substantially closed end to form an open enclosure with a hollow interior;
a cover;
the cover configured to be releasably connected to the electrical junction box;
the cover having a cover opening surrounded by a cover wall;
the cover wall having a non-continuous peripheral cover edge opposite a substantially closed cover end to form an open enclosure with a hollow interior;
wherein when an electrical outlet or switch is installed in the electrical junction box and the cover is installed on the electrical junction box, a portion of tabs of the electrical outlet or switch are positioned between the peripheral housing edge of the housing and the peripheral cover edge of the cover; and
wherein the peripheral housing edge and the peripheral cover edge engage in a mating and non-overlapping manner with one another along all of the peripheral housing edge and the peripheral cover edge except for at the one or more recesses.

37. A temporary cover for use with an electrical junction box, comprising:
a substantially closed surface;
a wall extending transversely from the substantially closed surface; and
connection holes on opposing, diagonal corners of the closed surface;
wherein the wall includes one or more recesses therein, said recesses formed in the wall such that the recess extends less distance from the substantially closed surface than the rest of the wall to form a non-continuous wall around a peripheral cover edge of the wall.

38. The temporary cover of claim 37, wherein the non-continuous wall comprises four wall portions extending transversely from the substantially closed portion.

39. The temporary cover of claim 37, wherein the non-continuous wall comprises a rectangular shape with two opposite side portions being longer than two opposite end portions, and the one or more recesses formed in the two opposite end portions.

40. The temporary cover of claim 37, further comprising one or more apertures configured to receive a mechanical fastener for temporarily attaching the cover to the electrical junction box.

41. The temporary cover of claim 37, further comprising one or more apertures through the substantially closed portion and/or non-continuous wall of the cover to receive a mechanical fastener for temporarily attaching the cover to the electrical junction box.

42. The temporary cover of claim 37, wherein the substantially closed surface comprises a substantially planar surface.

43. The temporary cover of claim 37, wherein the wall comprises a circular shape.

* * * * *